(12) United States Patent
Sato et al.

(10) Patent No.: US 7,955,747 B2
(45) Date of Patent: Jun. 7, 2011

(54) ELECTRONIC DEVICE AND ELECTRONIC DEVICE OPERATING CONTROL METHOD

(75) Inventors: Shigemasa Sato, Yokohama (JP); Takao Goto, Shinagawa-ku (JP); Akio Nishizawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/603,044

(22) Filed: Oct. 21, 2009

(65) Prior Publication Data

US 2010/0086816 A1    Apr. 8, 2010

Related U.S. Application Data

(63) Continuation of application No. 10/539,778, filed as application No. PCT/JP2003/016926 on Jun. 20, 2005.

(30) Foreign Application Priority Data

Jan. 8, 2003  (JP) .................. 2003-001761
Jan. 8, 2003  (JP) .................. 2003-001762

(51) Int. Cl.
    *H01M 8/00*    (2006.01)
    *H01M 8/04*    (2006.01)
(52) U.S. Cl. ......... 429/432; 429/400; 429/428; 429/430
(58) Field of Classification Search .................. 429/400, 429/428–432
    See application file for complete search history.

(56) References Cited

U.S. PATENT DOCUMENTS

| 6,461,751 B1 * | 10/2002 | Boehm et al. ................. 429/432 |
| 2004/0067398 A1 * | 4/2004 | Watanabe ...................... 429/24 |

FOREIGN PATENT DOCUMENTS

| EP | 0 982 788 A2 | 3/2000 |
| JP | A-03-276576 | 12/1991 |
| JP | 09-236641 A | 9/1997 |
| JP | 2000-046587 A | 2/2000 |
| JP | 2000-067896 | * 3/2000 |
| JP | A-2000-067896 | 3/2000 |
| JP | A-2001-273915 | 10/2001 |
| JP | 2002-005881 A | 1/2002 |
| JP | A-2002-020101 | 1/2002 |
| JP | 2002-050410 A | 2/2002 |
| JP | A-2002-056852 | 2/2002 |
| JP | A-2002-081331 | 3/2002 |
| JP | A-2002-373684 | 12/2002 |

* cited by examiner

*Primary Examiner* — Dah-Wei D. Yuan
*Assistant Examiner* — Steven Scully
(74) *Attorney, Agent, or Firm* — Oliff & Berridge, PLC

(57) ABSTRACT

Described is an electronic device and an electronic device control method. If voltage generated by the fuel cell, acquired from the voltage detection part, is greater than a specified voltage reference value (VRV), a display part displays the fuel cell as normal. However, if the generated voltage is smaller than the VRV, the residual fuel amount (RFA) detection part detects the RFA. If the RFA is smaller than a specified fuel reference value (FRV), the display part displays that the fuel is insufficient. However, if the RFA is greater than the FRV, the oxidizing agent concentration (OAC) detection part detects the OAC of the fuel cell. If the OAC is smaller than a specified OAC reference value, the display part displays that the oxidizing agent is insufficient. However, if the OAC is greater than the OAC reference value, the display part displays that the fuel cell is abnormal.

6 Claims, 19 Drawing Sheets

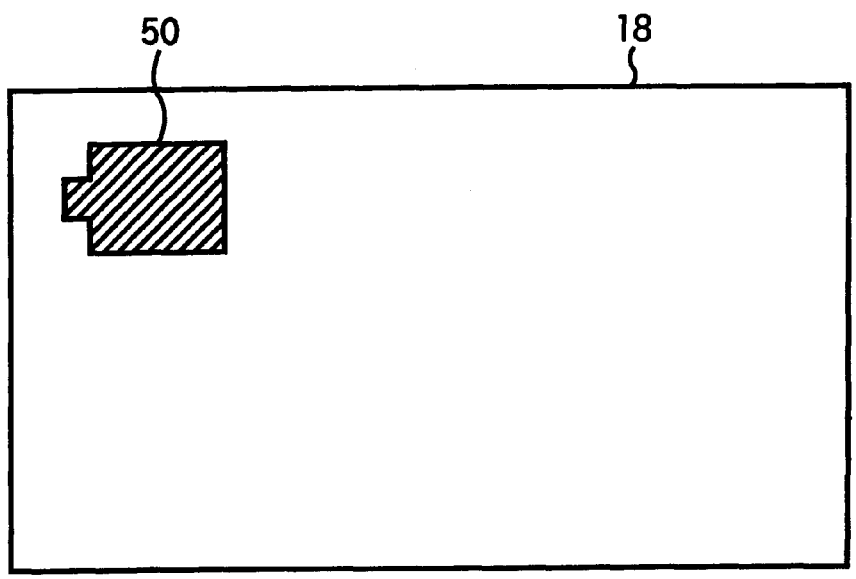
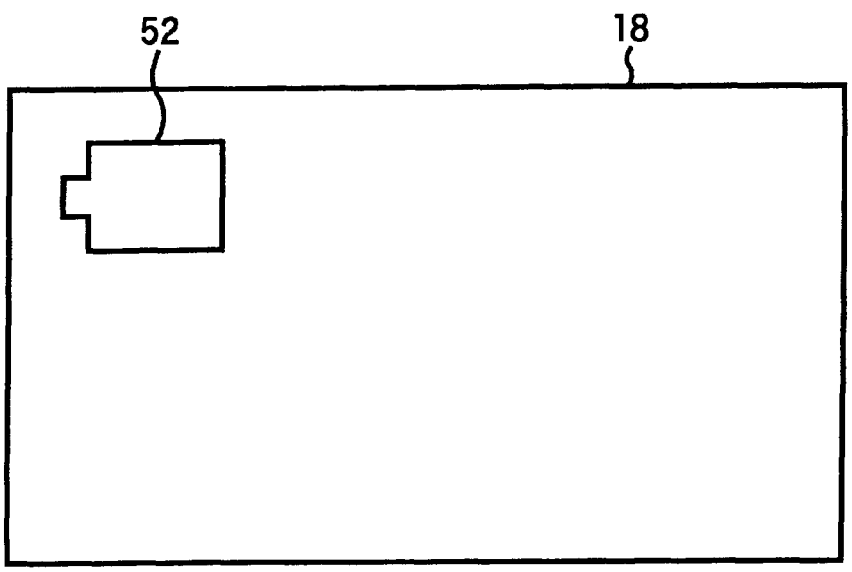

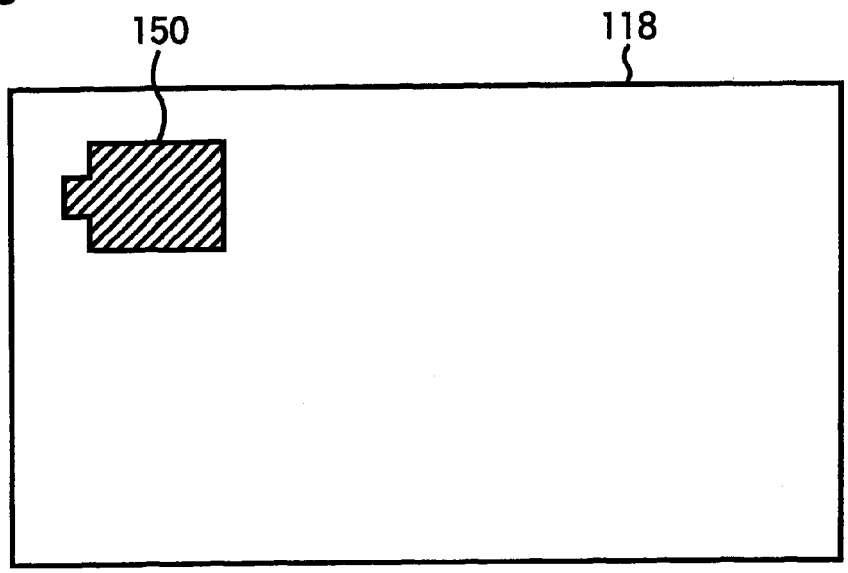
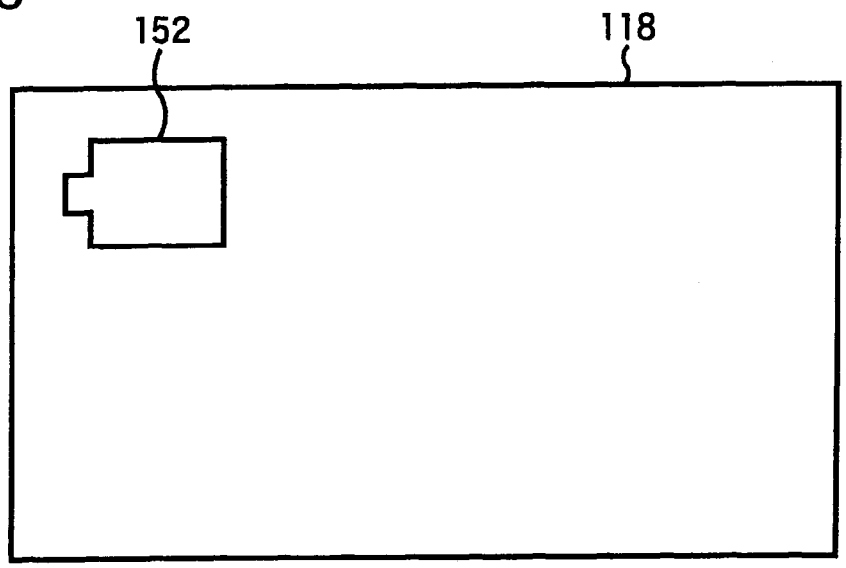

ELECTRONIC DEVICE AND ELECTRONIC DEVICE OPERATING CONTROL METHOD

CROSS-REFERENCE TO RELATED APPLICATION

This is a Continuation of application Ser. No. 10/539,778 filed Jun. 20, 2005, which in turn is a National Phase of Application No. PCT/JP03/016926, filed Dec. 26, 2003, which claims the benefit of Japanese Application Nos. 2003-001761 and 2003-001762, both filed Jan. 8, 2003. The disclosures of the prior applications is hereby incorporated by reference herein in its entirety.

TECHNICAL FIELD

The present invention relates to an electronic device and an electronic device operating control method, and more particularly relates to an electronic device using a fuel cell as a power supply and an electronic device operating control method in which the state of the fuel cell can be accurately determined.

BACKGROUND ART

Conventionally, portable electronic devices such as cameras and the like have used lithium batteries, alkali batteries or the like as power supplies. However, compact fuel cells have been proposed as the next generation of power supplies.

Besides using methanol, fuel cells use oxygen in the air as fuel.

However, in cases where a fuel cell is used as the power supply of a camera, the use time is limited by the amount of oxygen that is present inside the housing of the camera, so that the camera cannot be used for a long period of time.

On the other hand, in the case of an electronic device using a lithium battery, alkali batter or the like, the state of the battery can be determined by detecting the output voltage of the battery.

However, in the case of small fuel cells with a long useful life for which use in portable electronic devices or the like is envisioned, if only the output voltage of the cell is detected, the following problem arises: namely, in regard to the state of the cell, it cannot be determined whether there is no fuel (e. g., a fuel such as methanol or the like) remaining in the fuel cell, whether the oxygen is insufficient, or whether there is an abnormality in the cell parts.

DISCLOSURE OF THE INVENTION

The present invention was devised in light of such facts; it is an object of the present invention to allow an accurate determination of the state of the fuel cell.

The first electronic device of the present invention is characterized in that this device comprises voltage detection means for detecting the voltage that is generated by the fuel cell, residual fuel amount detection means for detecting the residual amount of fuel in the fuel cell, oxidizing agent concentration detection means for detecting the concentration of the oxidizing agent in the fuel cell, judgment means for judging the state of the fuel cell on the basis of the detection results of the voltage detection means, the residual fuel amount detection means and the oxidizing agent concentration detection means, and display means for displaying the state of the fuel cell judged by the judgment means.

The system can be devised so that the judgment means judge whether or not the voltage detected by the voltage detection means is smaller than a specified voltage reference value, and so that the display means display that the state of the fuel cell is normal in cases where it is judged by the judgment means that the voltage is greater than the voltage reference value.

The system can be devised so that in cases where it is judged by the judgment means that the voltage is greater than the voltage reference value, the display means indicate that the state of the fuel cell is normal using a display corresponding to the amount of time left on the fuel cell.

The system can be devised so that the judgment means further judge whether or not the oxidizing agent concentration detected by the oxidizing agent concentration detection means is greater than a specified oxidizing agent concentration reference value, and so that the display means display that the oxidizing agent is insufficient in cases where it is judged by the judgment means that the voltage is smaller than the voltage reference value and that the oxidizing agent concentration is smaller than the oxidizing agent concentration reference value, and display that the state of the fuel cell is abnormal in cases where it is judged by the judgment means that the voltage is smaller than the voltage reference value and that the oxidizing agent concentration is greater than the oxidizing agent concentration reference value.

The system can be devised so that in cases where it is judged by the judgment means that the oxidizing agent concentration is smaller than the oxidizing agent concentration reference value, a display indicating that the oxidizing agent concentration is insufficient is shown using a display corresponding to a frame count of the electronic device.

The system can be devised so that in cases where it is judged by the judgment means that the oxidizing agent concentration is greater than the oxidizing agent concentration reference value, a display indicating that the state of the fuel cell is abnormal can be shown using a display corresponding to the amount of time left on the fuel cell and a display corresponding to a frame count of the electronic device, with these displays further caused to flash.

The system can be devised so that the judgment means judge whether or not the residual fuel amount detected by the residual fuel amount detection means is greater than a specified fuel reference value, and so that the display means display that the residual fuel amount in the fuel cell is insufficient in cases where it is judged by the judgment means that the residual fuel amount is smaller than the fuel reference value.

The system can be devised so that in cases where it is judged by the judgment means that the residual fuel amount is smaller than the fuel reference value, the display means display that the residual fuel amount is insufficient using a display corresponding to the amount of time left on the fuel cell.

The first electronic device operating control method of the present invention is characterized in that this method comprises a voltage detection step in which the voltage generated by the fuel cell is detected, a residual fuel amount detection step in which the residual fuel amount in the fuel cell is detected, an oxidizing agent concentration detection step in which the oxidizing agent concentration in the fuel cell is detected, a judgment step in which the state of the fuel cell is judged on the basis of the detection results of the processing of the voltage detection step, the processing of the residual fuel amount detection step, and the processing of the oxidizing agent concentration detection step, and a display control step in which the display of the state of the fuel cell judged by the processing of the judgment step is controlled.

In the first electronic device and first electronic device operating control method of the present invention, the voltage generated by the fuel cell is detected, the residual fuel amount in the fuel cell is detected, the oxidizing agent concentration in the fuel cell is detected, the state of the fuel cell is judged on the basis of these detection results, and the display is controlled.

The second electronic device of the present invention is characterized in that this electronic device comprises voltage detection means for detecting the voltage generated by the fuel cell, residual fuel amount detection means for detecting the residual amount of fuel in the fuel cell, oxidizing agent concentration detection means for detecting the concentration of the oxidizing agent in the fuel cell, judgment means for judging the state of the fuel cell on the basis of the detection results of the voltage detection means, the residual fuel amount detection means, or the oxidizing agent concentration detection means, and oxidizing agent replenishment means for replenishing the oxidizing agent on the basis of the judgment results of the judgment means in order to increase the oxidizing agent concentration.

The system can be devised so that in cases where it is judged by the judgment means that the oxidizing agent concentration is smaller than a specified oxidizing agent concentration reference value, the oxidizing agent replenishment means replenish the oxidizing agent so that the oxidizing agent concentration is increased.

The system can be devised so that the electronic device further comprises control means for controlling the initiation of the replenishment of the oxidizing agent, and so that in cases where it is judged by the judgment means that the oxidizing agent concentration is smaller than a specified oxidizing agent concentration reference value, and a control of initiating the replenishment of the oxidizing agent is performed by the control means, the oxidizing agent replenishment means replenish the oxidizing agent so that the oxidizing agent concentration is increased.

The system can be devised so that the judgment means judge whether or not the voltage detected by the voltage detection means is smaller than a specified voltage reference value, and judge whether or not the oxidizing agent concentration detected by the oxidizing agent concentration detection means is greater than a specified oxidizing agent concentration reference value, and the judgment means judge that the oxidizing agent concentration is in a low state in cases where it is judged that the voltage is smaller than the voltage reference value, and that the oxidizing agent concentration is smaller than the oxidizing agent concentration reference value.

The second electronic device operating control method of the present invention is characterized in that this method comprises a voltage detection step in which the voltage generated by the fuel cell is detected, a residual fuel amount detection step in which the residual fuel amount in the fuel cell is detected, an oxidizing agent concentration detection step in which the oxidizing agent concentration in the fuel cell is detected, a judgment step in which the state of the fuel cell is judged on the basis of the detection results of the processing of the voltage detection step, the processing of the residual fuel amount detection step, or the processing of the oxidizing agent concentration detection step, and an oxidizing agent replenishment step in which the oxidizing agent is replenished on the basis of the judgment results obtained by the processing of the judgment step in order to increase the oxidizing agent concentration.

In the second electronic device and second electronic device operating control method of the present invention, the voltage generated by the fuel cell is detected, the residual fuel amount in the fuel cell is detected, the oxidizing agent concentration in the fuel cell is detected, the state of the fuel cell is judged on the basis of these detection results, and the oxidizing agent is replenished on the basis of these judgment results in order to increase the oxidizing agent concentration.

The third electronic device of the present invention comprises voltage detection means for detecting the voltage generated by the fuel cell, residual fuel amount detection means for detecting the residual amount of fuel in the fuel cell, oxidizing agent concentration detection means for detecting the concentration of the oxidizing agent in the fuel cell, judgment means for judging the state of the fuel cell on the basis of the detection results of the voltage detection means, the residual fuel amount detection means or the oxidizing agent concentration detection means, and oxidizing agent replenishment means for replenishing the oxidizing agent on the basis of the judgment results of the judgment means in order to increase the oxidizing agent concentration, and is characterized in that the oxidizing agent replenishment means constantly replenish air as the oxidizing agent via an oxidizing agent permeable membrane from air holes formed in the electronic device regardless of the judgment results of the judgment means.

The system can be devised so that the air holes are holes formed in a frame used to attach a speaker.

The third electronic device operating control method of the present invention comprises a voltage detection step in which the voltage generated by the fuel cell is detected, a residual fuel amount detection step in which the residual fuel amount in the fuel cell is detected, an oxidizing agent concentration detection step in which the oxidizing agent concentration in the fuel cell is detected, a judgment step in which the state of the fuel cell is judged on the basis of the detection results of the processing of the voltage detection step, the processing of the residual fuel amount detection step, or the processing of the oxidizing agent concentration detection step, and an oxidizing agent replenishment step in which the oxidizing agent is replenished on the basis of the judgment results obtained by the processing of the judgment step in order to increase the oxidizing agent concentration, and is characterized in that the processing of the oxidizing agent replenishment step constantly replenishes air as the oxidizing agent via an oxidizing agent permeable membrane from air holes formed in the electronic device regardless of the judgment results.

In the third electronic device and third electronic device operating control method of the present invention, the voltage generated by the fuel cell is detected, the residual fuel amount in the fuel cell is detected, the oxidizing agent concentration in the fuel cell is detected, the state of the fuel cell is judged on the basis of these detection results, and the oxidizing agent is replenished on the basis of these judgment results in order to increase the oxidizing agent concentration. Furthermore, air is constantly replenished as the oxidizing agent via an oxidizing agent permeable membrane from air holes formed in the electronic device regardless of the judgment results.

BRIEF DESCRIPTION OF THE DRAWINGS

FIG. 5 is a diagram showing a display example according to the processing of step S13 in FIG. 4;

FIG. 6 is a diagram showing a display example according to the processing of step S16 in FIG. 4;

FIG. 15 is a diagram showing an example of the display obtained by the processing of step S23 in FIG. 14;

FIG. 16 is a diagram showing an example of the display obtained by the processing of step S26 in FIG. 14;

BEST MODE FOR CARRYING OUT THE INVENTION

First, a first embodiment of the present invention will be described below.

Figure 1:
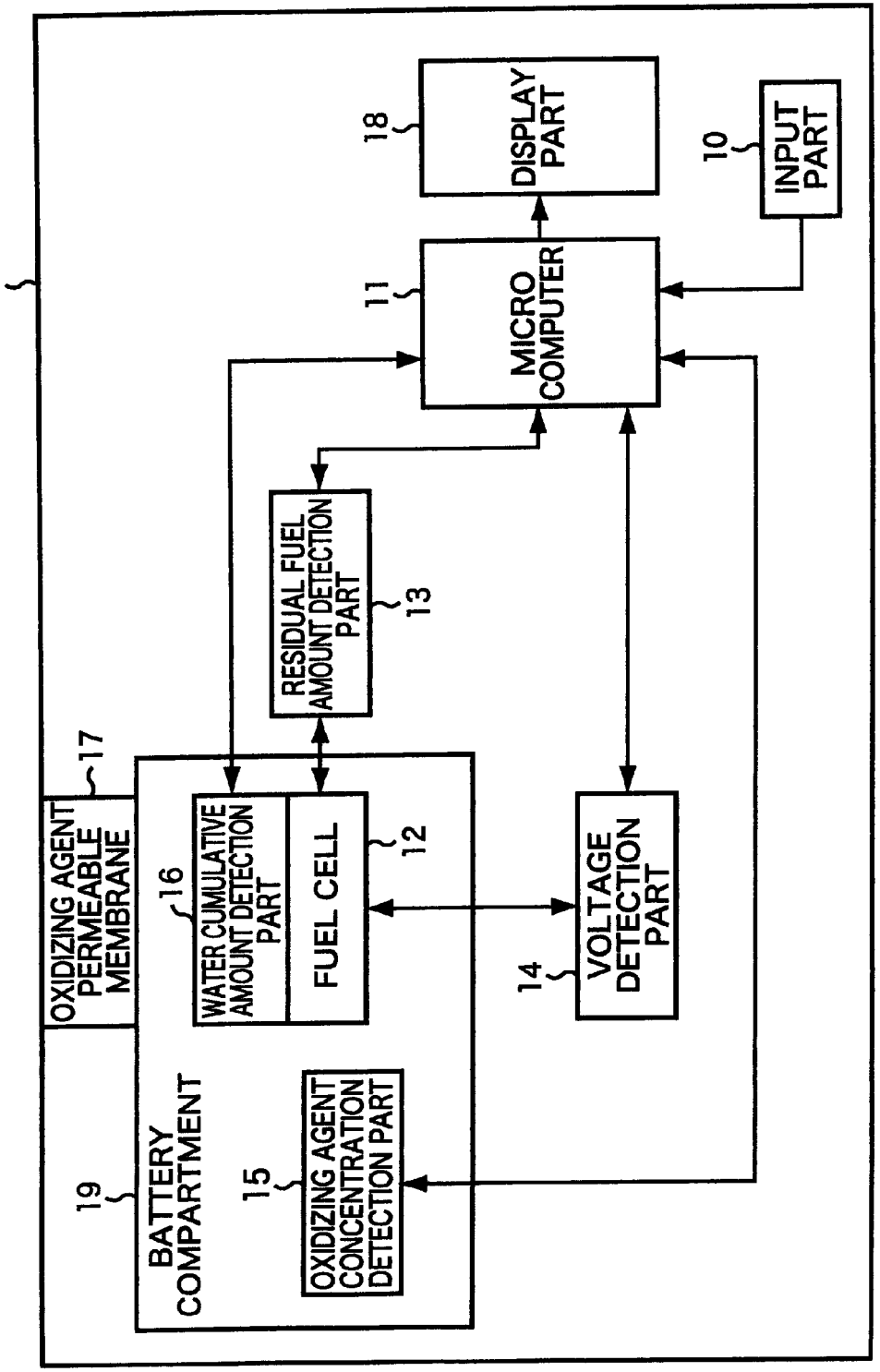
FIG. 1 is a block diagram showing an example of the construction of a camera using the present invention.

FIG. 1 is a block diagram showing an example of construction of a camera 1 using the present invention.

The camera 1 is constructed from an input part 10, a microcomputer 11, a fuel cell 12, a residual fuel amount detection part 13, a voltage detection part 14, an oxidizing agent concentration detection part 15, a water cumulative amount detection part 16, and a display part 18.

Operations performed by the user are input into the input part 10. The microcomputer 11 controls various parts on the basis of commands from the user. Internally, furthermore, the microcomputer 11 comprises a memory such as a ROM (read only memory), RAM (random access memory) or the like, and appropriately stores necessary information.

As one example, the fuel cell 12 uses methanol, and produces energy by utilizing oxygen contained in the air, so that energy can be supplied to various parts of the camera that require power.

The residual fuel amount detection part 13 detects the amount of residual fuel such as hydrogen, methanol, hydrogen carbide or the like in the fuel cell 12, and outputs the detected residual fuel amount to the microcomputer 11. The fuel cell 12 is disposed in a battery compartment 19, and outside air is supplied to this battery compartment 19 via an oxidizing agent permeable membrane 17.

The oxidizing agent permeable membrane 17 is a membrane or film that allows the oxidizing agent (e. g., oxygen) to pass through, but that does not allow water to pass through. This membrane is installed in the air holes of the camera 1. In particular, this oxidizing agent permeable membrane 17 is especially useful in cases where the camera 1 has anti-drip or waterproof specifications.

The voltage detection part 14 detects the voltage (or current) that is generated by the fuel cell 12, and outputs the detection results to the microcomputer 11.

The oxidizing agent concentration detection part 15 detects the concentration of the oxidizing agent used by the fuel cell 12 (the concentration of oxygen in the battery compartment 19) in the case of this example), and outputs the detection results to the microcomputer 11.

The water cumulative amount detection part 16 detects the amount of water that is produced and accumulated by the reaction of hydrogen and oxygen in the fuel cell 12, and outputs the detection results to the microcomputer 11.

The display part 18 displays the various states of the camera 1 under the control of the microcomputer 11.

Furthermore, the microcomputer 11 acquires the detection results of the residual fuel amount detection part 13, voltage detection part 14 and oxidizing agent concentration detection part 15, and causes the display part 18 to display the state of the camera 1 on the basis of the acquired detection results.

Figure 2:
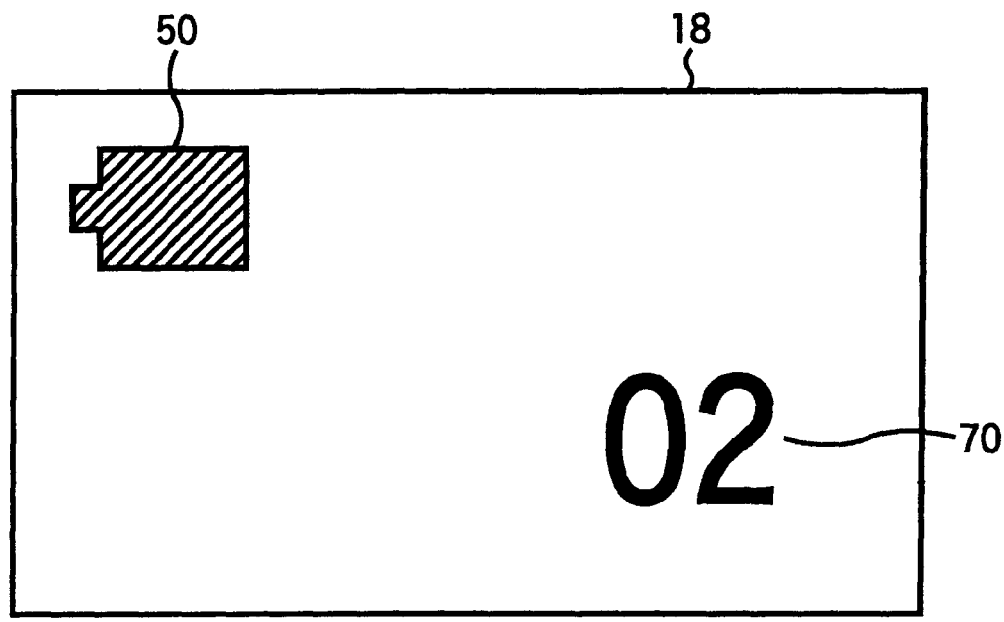
FIG. 2 is a diagram showing a display example in the display part in FIG. 1.

FIG. 2 is a diagram showing an example of display in the display part 18 shown in FIG. 1.

The mark 50 shown on the display part 18 is a display indicating the amount of time left on the fuel cell, while the mark 70 is a display indicating the frame count of the camera 1.

In cases where the state of the fuel cell 12 is displayed on the display part 18 (e. g., in cases where the state of the fuel cell 12 is displayed on the basis of an input into the input part 10 by the user), the mark 50 is used to indicate the residual amount of fuel (fuel such as hydrogen, methanol, hydrogen carbide or the like in the fuel cell 12), while the mark 70 is used to indicate an insufficiency in the oxidizing agent.

Furthermore, the mark which indicates an insufficiency in the oxidizing agent is also used as a display indicating the frame count of the camera 1; however, it would also be possible to use the calendar displayed on the display part for this additional purpose, or to install display used exclusively to indicate insufficiency of the oxidizing agent.

Figure 3:
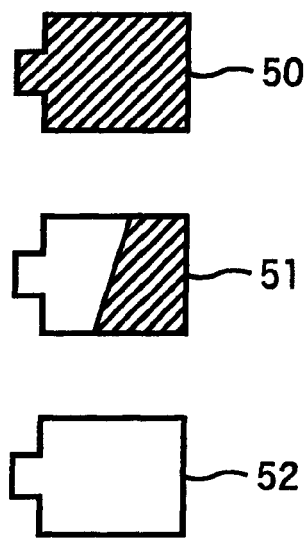
FIG. 3 is a diagram illustrating the marks displayed in the display part shown in FIG. 1.

The mark 51 or mark 52 shown in FIG. 3 is also displayed on the display device of the mark 50 in the display part 18.

In cases where the marks are displays indicating the amount of time left on the fuel cell, the mark 51 indicates that the amount of time left on the fuel cell 12 is approximately ½ to ⅓, and the mark 52 indicates that there is little residual time left on the fuel cell 12.

In cases where the marks are caused to display states of the fuel cell 12, the mark 52 indicates that there is no residual fuel amount. Furthermore, in the present embodiment, the mark 51 is not used; however, it would also be possible to use the mark 51 as the display of a message to the user that replenishment of the fuel (fuel such as hydrogen, methanol, hydrogen carbide or the like in the fuel cell 12) is required.

Figure 4:
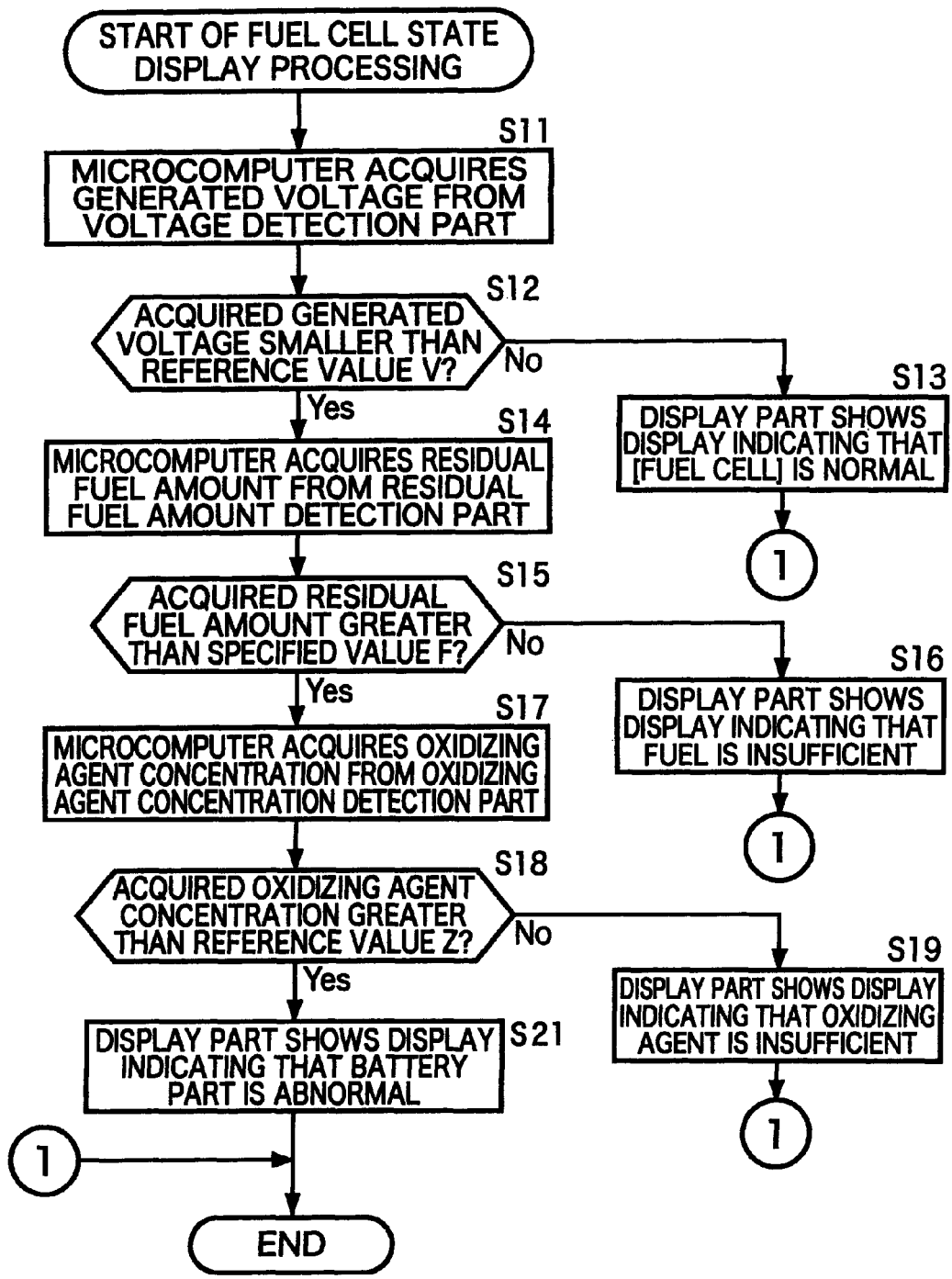
FIG. 4 is a flow chart illustrating the fuel cell state display processing in the camera shown in FIG. 1.

Next, the state display processing of the fuel cell 12 in the camera 1 will be described with reference to FIG. 4. Furthermore, this processing is started by the input of a command indicating the state of the fuel cell 12 into the input part 10 by the user. This processing may also be started periodically after the power supply switch is switched on.

In step S11, the microcomputer 11 causes the voltage detection part 14 to detect the voltage generated by the fuel cell 12, and acquires the generated voltage detected by the voltage detection part 14.

In step S12, the microcomputer 11 judges whether or not the generated voltage acquired from the voltage detection part 14 is smaller than a specified voltage reference value V. The microcomputer 11 stores the specified voltage reference value V beforehand in an internal memory (not shown in the figures). In cases where it is judged in step S12 that the generated voltage is not smaller than the specified voltage reference value V (i. e., is larger than the specified voltage reference value V), the microcomputer 11 judges that the state of the fuel cell 12 is normal, advances the processing to step S13, and causes the display part 18 to display that the state of the fuel cell 12 is normal. In other words, the judgment that the fuel cell 12 is normal is accomplished on the basis of the voltage alone. In this case, a display such as that shown in FIG. 5 is performed by the display part 18.

A mark 50 is displayed on the display part 18 shown in FIG. 5. As a result, it can be indicated to the user that the fuel cell 12 is normal.

In cases where it is judged in step S12 that the generated voltage is smaller than the specified voltage reference value V, the processing proceeds to step S14, and the microcomputer 11 causes the residual fuel amount detection part 13 to detect the residual fuel amount of the fuel cell 12, and acquires the residual fuel amount detected by the residual fuel amount detection part 13.

In step S15, the microcomputer 11 judges whether or not the residual fuel amount acquired from the residual fuel amount detection part 13 is greater than a specified fuel reference value F. The microcomputer 11 stores this specified fuel reference value beforehand in an internal memory. In cases where it is judged in step S15 that the residual fuel amount is not greater than the specified fuel reference value F (i. e., is smaller than the specified fuel reference value F), the microcomputer 11 judges that the state of the fuel cell 12 is a state of insufficient fuel, advances the processing to step S16, and causes the display part 18 to display that the fuel in the fuel cell 12 is insufficient. In this case, a display such as that shown in FIG. 6 is performed by the display part 18.

A mark 52 is displayed on the display part 18 shown in FIG. 6. As a result, it can be indicated to the user that the fuel in the fuel cell 12 is insufficient. Specifically, this judgment of insufficient fuel is performed when both the voltage and the fuel are smaller than the reference values.

In cases where it is judged in step S15 that the residual fuel amount is greater than the specified fuel reference value F, the processing proceeds to step S17, and the microcomputer 11 causes the oxidizing agent concentration detection part 15 to detect the oxidizing agent concentration of the fuel cell 12, and acquires the oxidizing agent concentration detected by the oxidizing agent concentration detection part 15.

In step S18, the microcomputer 11 judges whether or not the oxidizing agent concentration acquired from the oxidizing agent concentration detection part 15 is greater than a specified oxidizing agent concentration reference value Z. The microcomputer 11 stores the specified oxidizing agent concentration reference value Z beforehand in an internal memory. In cases where it is judged in step S18 that the oxidizing agent concentration is not greater than the specified oxidizing agent concentration reference value Z (i. e., is smaller than the specified oxidizing agent concentration reference value Z), the microcomputer 11 judges that the state of the fuel cell 12 is a state of insufficient oxidizing agent, advances the processing to step S19, and causes the display part 18 to display that the oxidizing agent in the fuel cell 12 is insufficient. In this case, a display such as that shown in FIG. 7 is shown on the display part 18.

Figure 7:
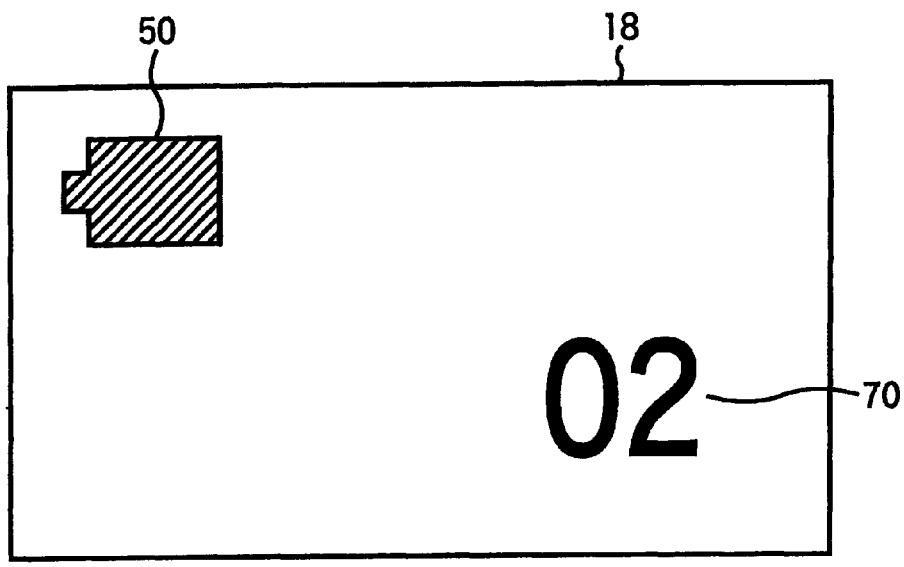
FIG. 7 is a diagram showing a display example according to the processing of step S19 in FIG. 4.

A mark 50 and a mark 70 are displayed on the display part 18 shown in FIG. 7. As a result, it can be indicated to the user that the oxidizing agent in the fuel cell 12 is insufficient (i. e., that the fuel cell 12 has a residual fuel amount, but that the oxidizing agent is insufficient). Specifically, this judgment that the oxidizing agent is insufficient is performed when the voltage is smaller than the reference value, the residual fuel amount is greater than the reference value, and the oxidizing agent is smaller than the reference value.

In cases where it is judged in step S18 that the oxidizing agent concentration is greater than the specified fuel reference value F, the processing proceeds to step S20, and the microcomputer 11 judges that the state of the fuel cell 12 is abnormal, and causes the display part 18 to display that the battery part is abnormal. In this case, the microcomputer 11 causes the display part 18 to show a flashing display of the type shown in FIG. 8 (a display in which the mark 52 and mark 70 are caused to flash). As a result, the abnormality of the battery part is reported to the user.

Figure 8:
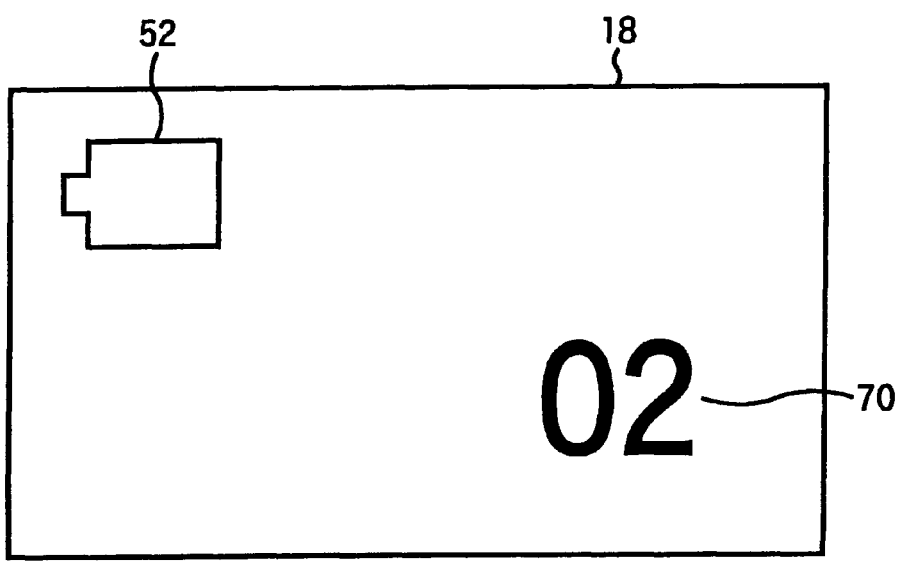
FIG. 8 is a diagram showing a display example according to the processing of step S20 in FIG. 4.

The mark 52 and mark 70 are displayed on the display part shown 18 shown in FIG. 8, and the mark 52 and mark 70 are caused to flash. As a result, it can be indicated to the user that the state of the fuel cell 12 (i. e., the state of the battery part in which the fuel cell 12 is accommodated) is abnormal (this state is abnormal since the generated voltage is low in spite of the fact that there is fuel in the fuel cell 12 and the oxidizing agent is not insufficient).

Thus, in cases where the generated voltage of the fuel cell 12 is smaller than the specified voltage reference value (a judgment of YES in step S12), the residual fuel amount in the fuel cell 12 is greater than the specified fuel reference value F (a judgment of YES is step S15), and the oxidizing agent concentration in the fuel cell 12 is greater than the oxidizing agent concentration reference value Z (a judgment of YES in step S18), it is judged that the state of the fuel cell 12 or battery part (peripheral part of the fuel cell 12) is abnormal.

The processing is ended following the processing of step S13, following the processing of step S16, following the processing of step S19, or following the processing of step S20.

Since the system is devised so that the generated voltage of the fuel cell 12, the residual fuel amount and the oxidizing agent concentration are detected by the above processing, it can be determined that the fuel cell is abnormal.

Furthermore, since the system is devised so that the state of the fuel cell 12 is displayed on the display part 18 using the mark 50 (mark 51 or 52) corresponding to the amount of time left on the fuel cell in the display part 18 and a display (mark 70) corresponding to the frame count of the camera 1, the state of the fuel cell 12 can be displayed without installing any special display means.

A case in which the present invention is applied to a camera has been described as an example above; however, the present invention can also be applied to electronic devices other than cameras.

Next, a second embodiment of the present invention will be described below.

Figure 9:
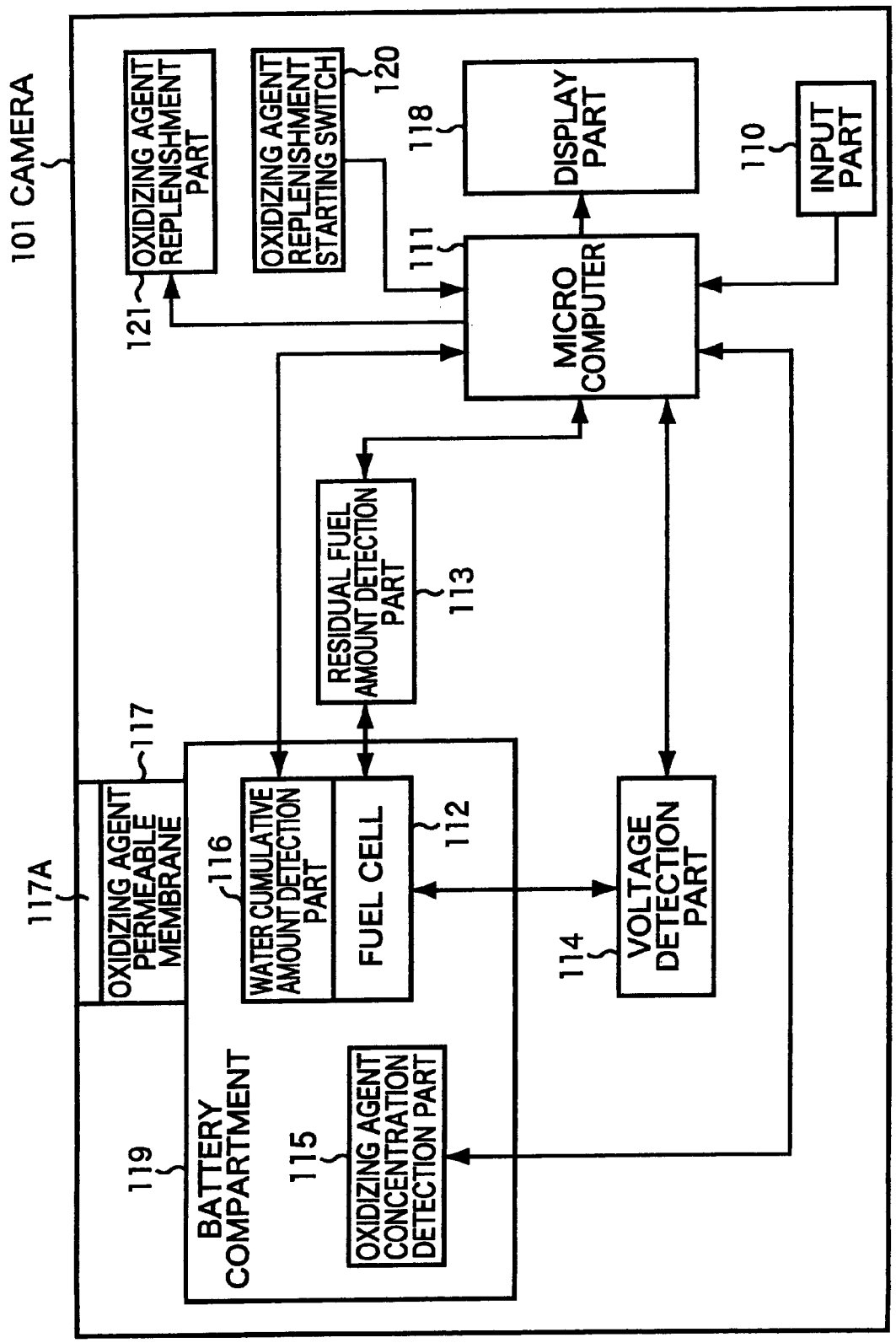
FIG. 9 is a block diagram showing another example of construction of a camera using the present invention.

FIG. 9 is a block diagram showing an example of construction of a camera 101 using the present invention.

The camera 101 is constructed from an input part 110, a microcomputer 111, a fuel cell 112, a residual fuel amount detection part 113, a voltage detection part 114, an oxidizing agent concentration detection part 115, a water cumulative amount detection part 116, a display part 118, an oxidizing agent replenishment starting switch 120, and an oxidizing agent replenishment part 121.

The input part 110 inputs operations by the user. The microcomputer 111 controls respective parts on the basis of commands from the user. Furthermore, the microcomputer 111 has an internal memory such as a ROM (read only memory), RAM (random access memory) or the like, and appropriately stores necessary information.

As one example, the fuel cell 112 uses methanol, and produces energy utilizing oxygen in the air, so that this fuel cell 112 supplies respective parts of the camera 101 that require energy.

The residual fuel amount detection part 113 detects the residual amount of fuel such as hydrogen, methanol, hydrogen carbide or the like in the fuel cell 112, and outputs the detected residual fuel amount to the microcomputer 111. The fuel cell 112 is disposed in a battery compartment 119, and air from the outside is supplied to this battery compartment 119 via an oxidizing agent permeable membrane 117.

The oxidizing agent permeable membrane 117 is a membrane or film that allows the passage of an oxidizing agent (e.g., oxygen), but prevents the passage of water; this membrane is installed in the air holes 117A of the camera 101. This oxidizing agent permeable membrane 117 is especially useful in cases where the camera 101 has anti-drip or waterproof specifications.

The voltage detection part 114 detects the voltage (or current) that is generated by the fuel cell 112, and outputs the detection results to the microcomputer 111.

The oxidizing agent concentration detection part 115 detects the concentration of the oxidizing agent that is used by the fuel cell 112 (in the case of this example, the concentration of oxygen in the battery compartment 119), and outputs the detection results to the microcomputer 111.

The water cumulative amount detection part 116 detects the amount of accumulated water produced by the reaction of hydrogen and oxygen in the fuel cell 112, and outputs the detection results to the microcomputer 111.

The display part 118 displays various stats of the camera 101 under the control of the microcomputer 111.

Furthermore, the microcomputer 111 acquires the detection results residual fuel amount detection part 113, voltage detection part 114 and oxidizing agent concentration detection part 115, and causes the display part 118 to display the state of the camera 101 on the basis of the acquired detection results.

The oxidizing agent replenishment starting switch 120 is switched on or off by the user. In concrete terms, this switch is switched on in cases where outside air is taken into the interior of the camera 101, and is switched off in cases where outside air is not taken into the interior of the camera 101. The oxidizing agent replenishment part 121 supplies oxygen (an oxidizing agent) to the interior of the camera 101 when the oxidizing agent replenishment starting switch 120 is switched on.

Figure 10:
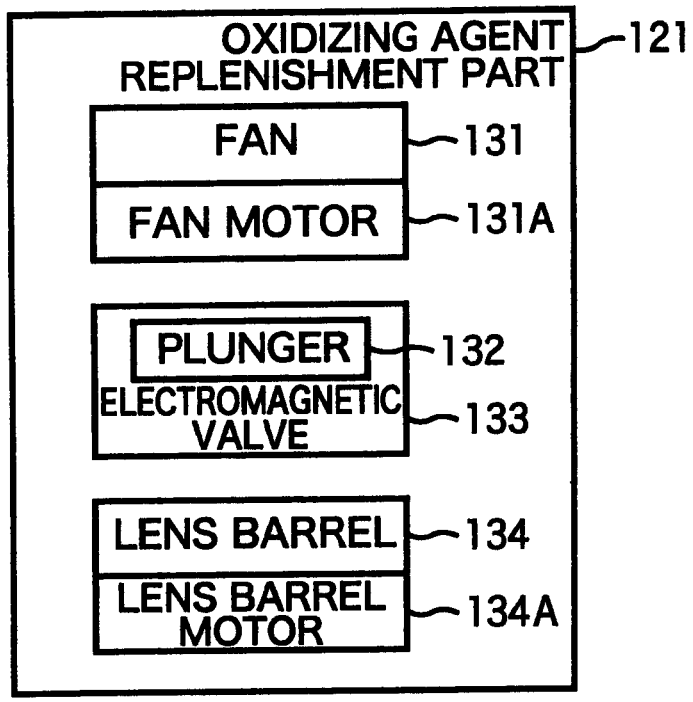
FIG. 10 is a block diagram showing the construction of the oxidizing agent supply part of the camera shown in FIG. 9.

As is shown in FIG. 10, for example, the oxidizing agent replenishment part 121 is constructed from a fan 131 that is caused to rotate by a fan motor 131A, an electromagnetic valve 133 that has a plunger 132, a lens barrel 134 that is caused to advance and retract by a lens barrel motor 134A and the like.

Figure 11:
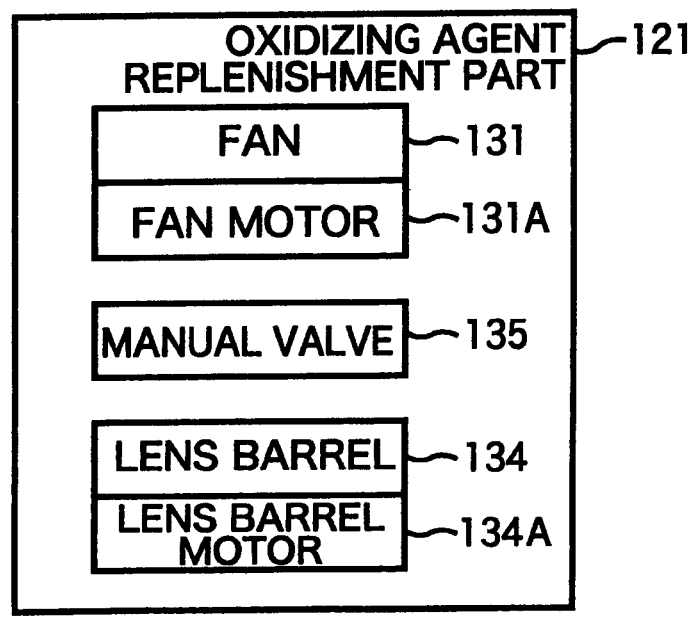
FIG. 11 is a block diagram showing the construction of the oxidizing agent supply part of the camera shown in FIG. 9.

Alternatively, as is shown in FIG. 11, a manual valve 135 is disposed in the oxidizing agent replenishment part 121 instead of the electromagnetic valve 133 shown in FIG. 10. The principle of the replenishment of the oxidizing agent by the oxidizing agent replenishment part 121 will be described later.

Figure 12:
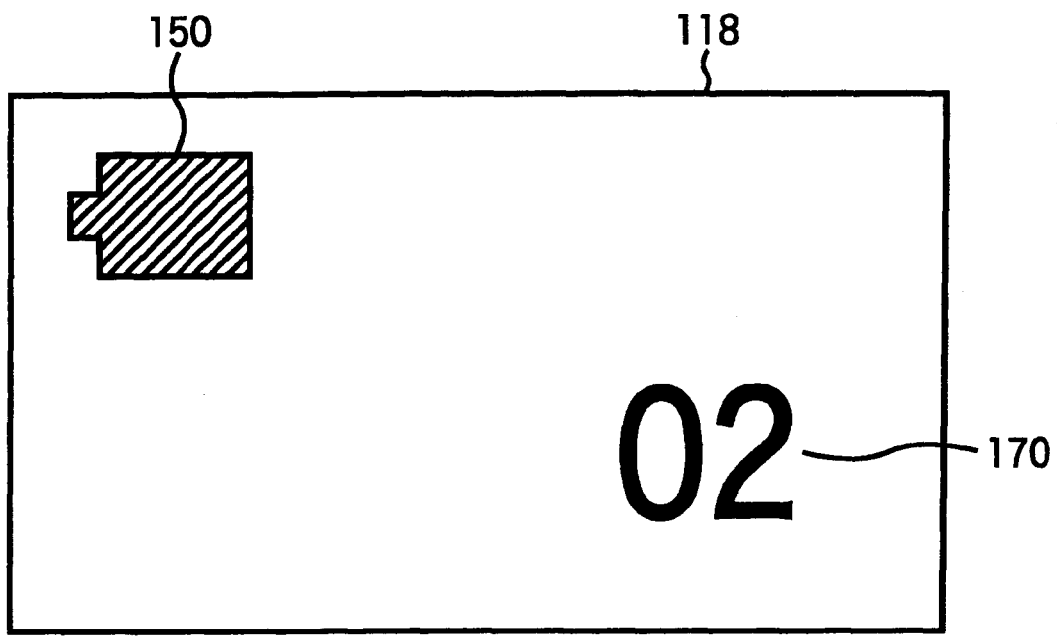
FIG. 12 is a diagram showing a display example in the display part shown in FIG. 9.

FIG. 12 is a diagram showing an example of the display in the display part 118 shown in FIG. 9.

The mark 150 displayed on the display part 118 is a display indicating the residual time left on the fuel cell, and the mark 170 is a display indicating the frame count of the camera 101.

In cases where the state of the fuel cell 112 is displayed on the display part 118 (e.g., in cases where the state of the fuel cell 112 is displayed on the basis of input into the input device 110 by the user), the mark 150 is used to indicate the residual amount of fuel (fuel such as hydrogen, methanol, hydrogen carbide or the like in the fuel cell 112), and the mark 170 is used to indicate an insufficiency in the oxidizing agent.

Furthermore, the mark that is used to indicate an insufficiency in the oxidizing agent is also used as a display (numeral) that indicates the frame count of the camera 101; however, for example, it would also be possible to use the calendar displayed on the display part 118 for this additional purpose, or to install display used exclusively to indicate insufficiency of the oxidizing agent.

Figure 13:
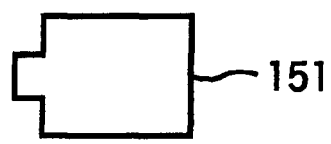
FIG. 13 is a diagram illustrating the marks that are displayed in the display part shown in FIG. 9.

A mark 151 may also be displayed in the display position of the mark 150 on the display part 118 instead of the mark 150 shown in FIG. 13.

In cases where the marks are displays indicating the residual time left on the fuel cell, the mark 150 indicates that there is a large residual time left on the fuel cell 112, and the mark 151 indicates that there is little residual time left on the fuel cell 112.

In cases where the marks are caused to indicate the state of the fuel cell 112, the mark 151 indicates that there is no residual fuel left (i.e., that the residual fuel amount is less than the reference value).

Next, the state display processing of the fuel cell 112 in the camera 101 will be described with reference to the flow chart shown in FIG. 14. Furthermore, this processing is started when a command to display the state of the fuel cell 112 is input into the input part 110 by the user.

In step S21, the microcomputer 111 causes the voltage detection part 114 to detect the generated voltage of the fuel cell 112, and acquires the generated voltage detected by the voltage detection part 114.

In step S22, the microcomputer 111 judges whether or not the generated voltage acquired from the voltage detection part 114 is smaller than a specified voltage reference value V. The microcomputer 111 stores the specified voltage reference value V beforehand in an internal memory (not shown in the figures). In cases where it is judged in step S22 that the generated voltage is not smaller than the specified voltage reference value V (i.e., is greater than the specified voltage reference value V), the microcomputer 111 judges that the state of the fuel cell 112 is normal, advances the processing to step S23, and causes the display part 118 to display that the fuel cell 112 is normal. Specifically, this judgment that the fuel cell 112 is normal is accomplished on the basis of the voltage alone. In this case, a display such as that shown in FIG. 15 is performed by the display part 118.

A mark 150 is displayed on the display part 118 shown in FIG. 15. As a result, it can be indicated to the user that the fuel cell 112 is normal.

In cases where it is judged in step S22 that the generated voltage is smaller than the specified voltage reference value V, the processing proceeds to step S24, and the microcomputer 111 causes the residual fuel amount detection part 113 to detect the residual fuel amount of the fuel cell 112, and acquires the residual fuel amount detected by the residual fuel amount detection part 113.

In step S25, the microcomputer 111 judges whether or not the residual fuel amount acquired from the residual fuel amount detection part 113 is greater than a specified fuel reference value F. The microcomputer 111 stores the specified fuel reference value F beforehand in an internal memory. In cases where it is judged in step S25 that the residual fuel amount is not greater than the specified fuel reference value F (i. e., is smaller than the specified fuel reference value F), the microcomputer 111 judges that the state of the fuel cell 112 is a state of insufficient fuel, advances the processing to step S26, and causes the display part 118 to display that the fuel of the fuel cell 112 is insufficient. In this case, a display such as that shown in FIG. 16 is displayed on the display part 118.

A mark 151 is displayed on the display part 118 in FIG. 16. As a result, it can be indicated to the user that the fuel of the fuel cell 112 is insufficient. Specifically, this judgment of fuel insufficiency is made when both the voltage and fuel are smaller than the reference values.

In cases where it is judged in step S25 that the residual fuel amount is greater than the specified fuel reference value F, the processing proceeds to step S27, and the microcomputer 111 causes the oxidizing agent concentration detection part 115 to detect the oxidizing agent concentration of the fuel cell 112, and acquires the oxidizing agent concentration detected by the oxidizing agent concentration detection part 115.

In step S28, the microcomputer 111 judges whether or not the oxidizing agent concentration acquired from the oxidizing agent concentration detection part 115 is greater than a specified oxidizing agent concentration reference value Z. The microcomputer 111 stores this specified oxidizing agent concentration reference value Z beforehand in an internal memory. In cases where it is judged in step S28 that the oxidizing agent concentration is not greater than the oxidizing agent concentration reference value Z (i. e., is smaller than the oxidizing agent concentration reference value Z), the microcomputer 111 judges that the state of the fuel cell 112 is a state of insufficient oxidizing agent, advances the processing to step S29, and causes the display part 118 to display that the oxidizing agent of the fuel cell 112 is insufficient. In this case, a display such as that shown in FIG. 17 is shown on the display part 118.

Figure 17:
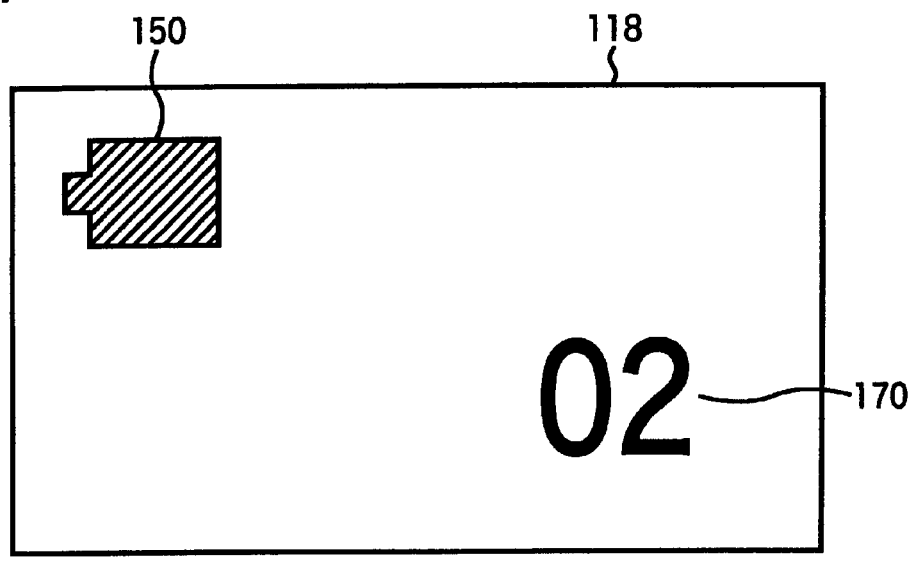
FIG. 17 is a diagram showing an example of the display obtained by the processing of step S29 in FIG. 14.

A mark 150 and mark 170 are displayed on the display part 118 in FIG. 17. As a result, it can be indicated to the user that the oxidizing agent of the fuel cell 112 is insufficient (i. e., that there is residual fuel in the fuel cell 112, but that the oxidizing agent is insufficient). Specifically, this judgment that the oxidizing agent is insufficient is made when the voltage is smaller than the reference value, the residual fuel amount is greater than the reference value, and the oxidizing agent is smaller than the reference value.

In step S30, the microcomputer 111 causes the oxidizing agent replenishment part 121 to execute oxidizing agent replenishment processing. Furthermore, this processing will be described later with reference to FIGS. 19 through 29. As a result, the oxidizing agent (oxygen in the case of this example) is replenished in the fuel cell 112.

In cases where it is judged in step S28 that the oxidizing agent concentration is greater than the oxidizing agent concentration reference value Z, the processing proceeds to step S31, and the microcomputer 111 judges that the state of the fuel cell 112 is abnormal, and causes the display part 118 to display that the battery part is abnormal. In this case, the microcomputer 111 causes the display part 118 to show a display such as that shown in FIG. 18 as a flashing display (i. e., to display the mark 151 and mark 170 as flashing displays). As a result, the abnormality of the battery part is reported to the user.

Figure 18:
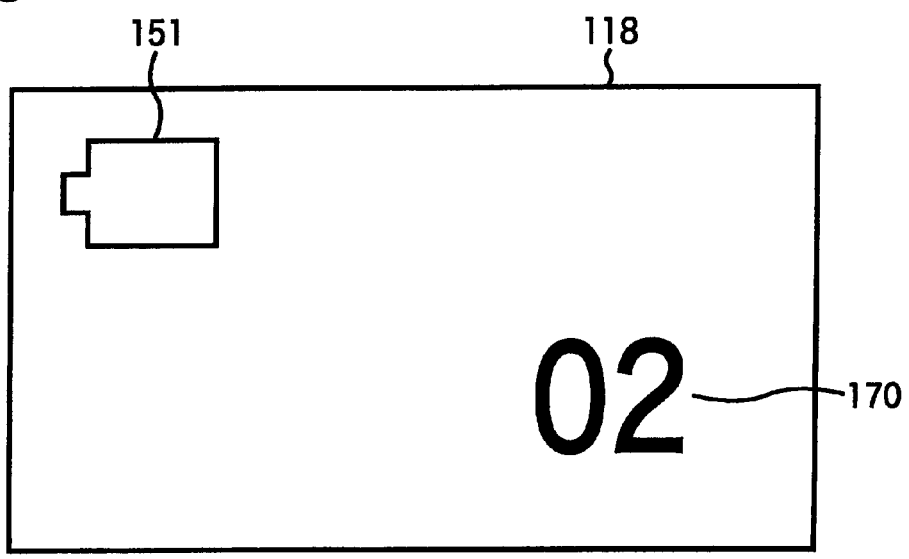
FIG. 18 is a diagram showing an example of the display obtained by the processing of step 31 in FIG. 14.

A mark 151 and a mark 170 are displayed on the display part 118 shown in FIG. 18, and the mark 151 and mark 170 are caused to flash. As a result, it can be indicated to the user that the state of the fuel cell 112 (i. e., the battery part containing the fuel cell 112) is abnormal (i. e., that this part is abnormal since the generated voltage is low in spite of the fact that the fuel cell 112 has fuel and there is no insufficiency of the oxidizing agent, either).

Thus, it is judged that the state of the fuel cell 112 or battery part (peripheral part of the fuel cell 112) is abnormal in cases where the generated voltage of the fuel cell 112 is smaller than the specified voltage reference value V (a judgment of YES in step S22), the residual fuel amount in the fuel cell 112 is greater than the specified fuel reference value F (a judgment of YES in step S25), and the oxidizing agent concentration of the fuel cell 112 is greater than the specified oxidizing agent concentration reference value Z (a judgment of YES in step S28).

The processing is ended following the processing of step S23, following the processing of step S26, following the processing of step S30 or following the processing of step S31.

Since the system is devised so that the generated voltage, residual fuel amount and oxidizing agent concentration of the fuel cell 112 are detected as a result of the abovementioned processing, it can be determined that the fuel cell is in an abnormal state.

Furthermore, since the system is devised so that the state of the fuel cell 112 is displayed on the display part 118 using a mark 150 (mark 151) corresponding to an instantaneous display of the residual fuel amount by the display part 118 and a display (mark 170) corresponding to the frame count of the camera 101, the state of the fuel cell 112 can be displayed without installing special display means.

Furthermore, in cases where it is judged that the oxidizing agent is insufficient, the oxidizing agent can be replenished in the fuel cell 112 (step S30). As a result, the oxidizing agent concentration can be increased.

An example of the oxidizing agent replenishment processing (processing of step S30) that is executed by the oxidizing agent replenishment part 121 will be described below.

Figure 19:
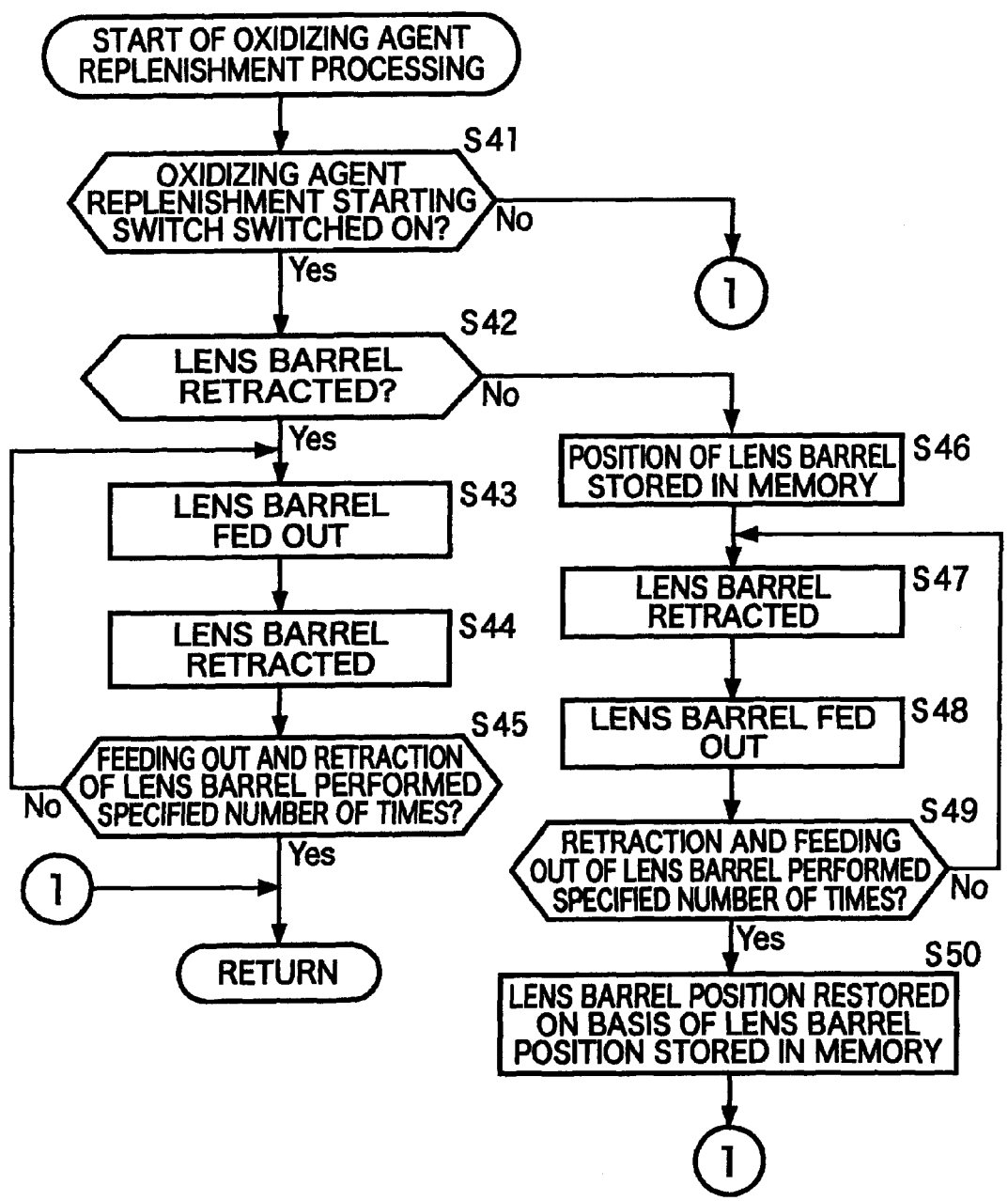
FIG. 19 is a flow chart illustrating the oxidizing replenishment processing in the camera shown in FIG. 9.

FIG. 19 is a flow chart which illustrates an example of the oxidizing agent replenishment processing utilizing the lens barrel. Furthermore, this processing is executed as the processing of step S30 in FIG. 14.

In step S41, the microcomputer 111 judges whether or not the oxidizing agent replenishment starting switch 120 has been switched on. The oxidizing agent replenishment switch is switched on or off by the user. The user switches this switch on when oxidizing agent replenishment is permitted, and switches this switch off when oxidizing agent replenishment is not permitted.

In cases where it is judged in step S41 that the oxidizing agent replenishment starting switch 120 has been switched on, the processing proceeds to step S42, and the microcomputer 111 judges whether or not the lens barrel 134 constituting the oxidizing agent replenishment part 121 is retracted.

Figure 20:
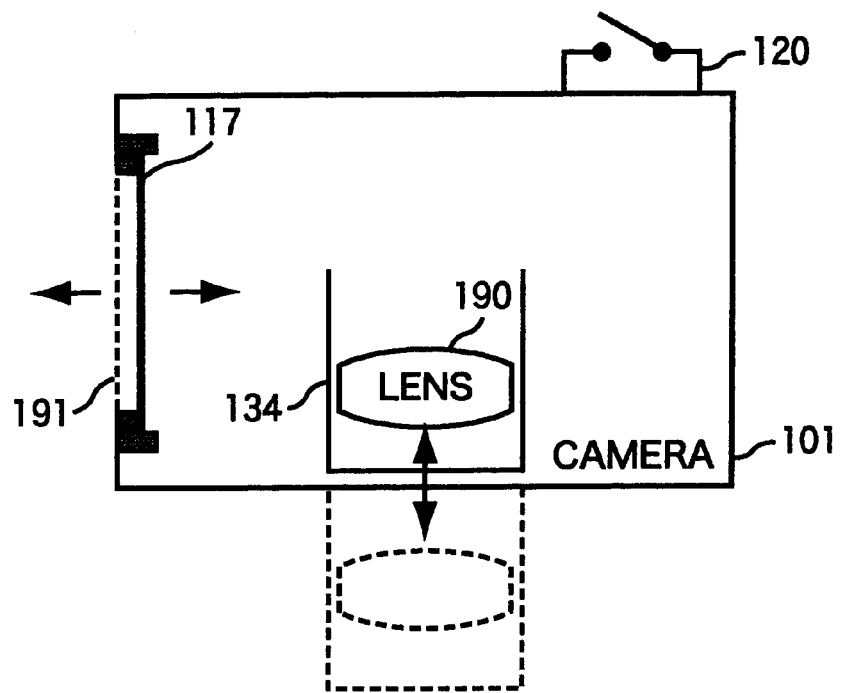
FIG. 20 is a diagram illustrating the oxidizing agent replenishment processing in the flow chart shown in FIG. 19.

In cases where it is judged in step S42 that the lens barrel 134 is retracted, the processing proceeds to step S43, and the microcomputer 111 controls the lens barrel motor 134A of the oxidizing agent replenishment part 121 so that the lens barrel 134 is fed out (i. e., moved from the state (retracted state) indicated by a solid line in FIG. 20 to the state (fed-out state) indicated by a broke line).

As is shown in FIG. 20, a lens barrel 134 which has a lens 190 is disposed inside substantially the center of the front surface (lower surface in the figures) of the camera 101 so that this lens barrel 134 can advance and retract. Furthermore, air holes 191 are formed in the left side of the camera 101 (in the figures), and external air flows into and out of the interior of the camera 101 via the air holes 191. Furthermore, in the example shown in FIG. 20, the air holes 191 are located on the left side of the camera 101 in FIG. 20; however, these air holes 191 may also be formed in a location other than the left side.

When the lens barrel 134 is fed out, the air pressure inside the camera 101 is reduced, so that air is taken into the camera 101 via the air holes 191. As a result, fresh air can be supplied to the fuel cell 112 of the camera 101.

Following the processing of step S43, the processing proceeds to step S44, and the microcomputer 111 controls the lens barrel motor 134A of the oxidizing agent replenishment part 121 so that the lens barrel 134 is retracted. In concrete terms, the lens barrel 134 is caused to move from the state indicated by the broken line in FIG. 20 (a state in which the lens barrel 134 is fed out) to the state indicated by the solid line (a state in which the lens barrel 134 is retracted).

When the lens barrel 134 is retracted, the air pressure inside the camera 101 rises, so that air is discharged from the camera 101 via the air holes 191.

In step S45, the microcomputer 111 judges whether or not the feed-out and retraction operations of the lens barrel 134 have been performed a specified number of times. In cases where it is judged that the feed-out and retraction operations of the lens barrel 134 have not yet been performed a specified number of times, the processing returns to step S43, and the subsequent processing is repeated. Specifically, the feed-out and retraction operations of the lens barrel 134 are repeated (i. e., are performed a specified number of times) so that air is caused to flow in and out via the air holes 191.

As a result of the feed-out and retraction operations of the lens barrel 134 being performed a specified number of times, the air inside the camera 101 is replaced. As a result, fresh air can be supplied to the fuel cell 112 inside the battery compartment 119.

In cases where it is judged in step S42 that the lens barrel 134 is not retracted (i. e., in cases where the camera 101 is in use), the processing proceeds to step S46, and the microcomputer 111 stores the current position of the lens barrel 134 in the internal memory.

In step S47, the microcomputer 111 controls the lens barrel motor 134A so that the lens barrel 134 is retracted. For example, the lens barrel 134 assumes the state indicated by the solid line in FIG. 20 from the state indicated by the broken line.

In step S48, the microcomputer 111 controls the lens barrel motor 134A so that the lens barrel 134 is fed out. Here, the lens barrel 134 assumes the state indicated by the broken line in FIG. 20 from the state indicated by the solid line.

As a result of the processing of step S47 and step S48, the lens barrel 134 is retracted or fed out; accordingly, the air inside the camera 101 flows in and out via the air holes 191. As a result, fresh air can be supplied to the fuel cell 112 of the camera 101.

In step S49, the microcomputer 111 judges whether or not the retraction and feed-out operations of the lens barrel 134 have been performed a specified number of times. In cases where it is judged that the retraction and feed-out operations of the lens barrel 134 have not yet been performed a specified number of times, the processing returns to step S47, and the subsequent processing is repeated. Specifically, the retraction and feed-out operations of the lens barrel 134 are repeated (i. e., are performed a specified number of times) so that air is caused to flow in and out via the air holes 191 (i. e., so that the air inside the camera 101 is caused to flow in and out).

In cases where it is judged in step S49 that the retraction and feed-out operations of the lens barrel 134 have been performed a specified number of times, the processing proceeds to step S50, and the microcomputer 111 controls the lens barrel motor 134A so that the position of the lens barrel 134 is caused to return to the lens barrel position stored in memory by the processing of step S46. As a result, the position of the lens barrel 134 returns to the position prior to the processing of steps S47 through S49.

In cases where it is judged in step S41 that the oxidizing agent replenishment starting switch 120 is off, the processing of step S42 through step S50 is skipped, and the processing is ended. Furthermore, in cases where it is judged that the feed-out and retraction operations of the lens barrel 134 have been performed a specified number of times as a result of the processing of step S45, or following the processing of step S50, the processing is ended.

By thus moving the lens barrel 134 of the oxidizing agent replenishment part 121, the microcomputer 111 exchanges the air inside the camera 101, and replenishes the oxygen (air) used as an oxidizing agent inside the camera 101 (inside the battery compartment 119). The fuel cell 112 performs a power generating operation using the oxygen in this air.

Furthermore, the microcomputer 111 stores the position of the lens barrel 134 in memory prior to executing the oxidizing agent replenishment processing, and returns the lens barrel 134 to the stored position following the completion of the oxidizing agent replenishment processing; accordingly, this air exchange operation does not interfere with the intrinsic imaging operation of the camera 101.

Figure 21:
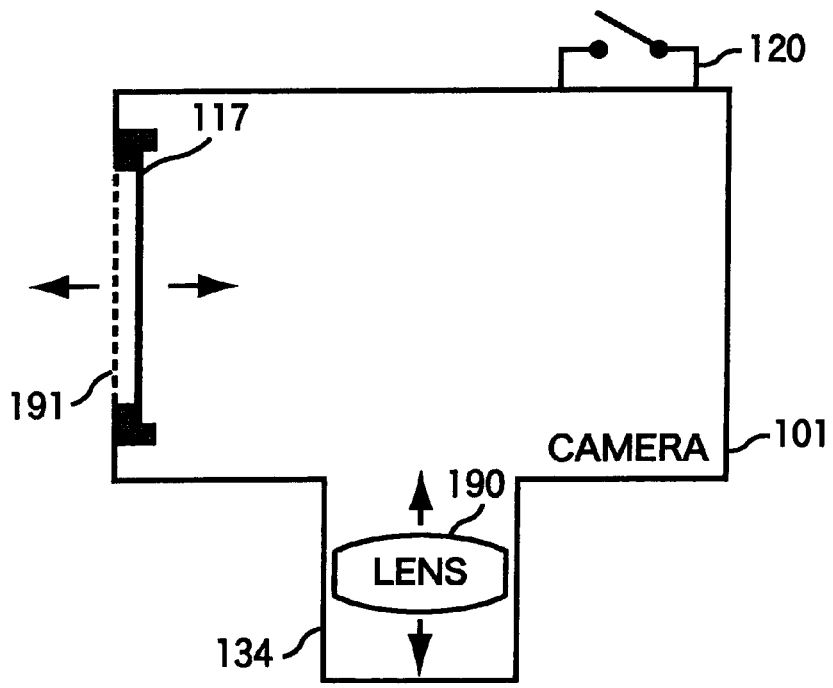
FIG. 21 is a diagram illustrating the oxidizing agent replenishment processing in the flow chart shown in FIG. 19.

Furthermore, as is shown in FIG. 21, similar effects and merits can also be obtained by making the lens barrel 134 fixed, and advancing and retracting the internal lens 190 inside the lens barrel 134.

Furthermore, it would also be possible to install an oxidizing agent permeable membrane 117 on the right side of the air holes 191 in FIGS. 20 and 21 (i. e., on the inside of the camera 101). As a result, invasion by water can be prevented.

Furthermore, no fan 131 is installed in the example shown in FIGS. 20 and 21; however, it would also be possible to install a fan 131.

Figure 22:
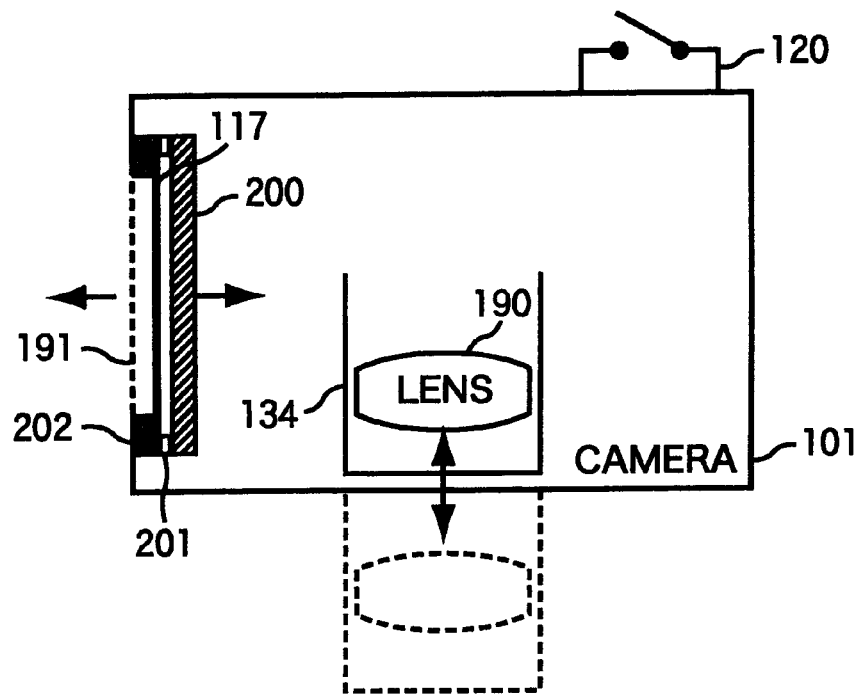
FIG. 22 is a diagram showing another example of construction for the oxidizing agent replenishment processing.
Figure 23:
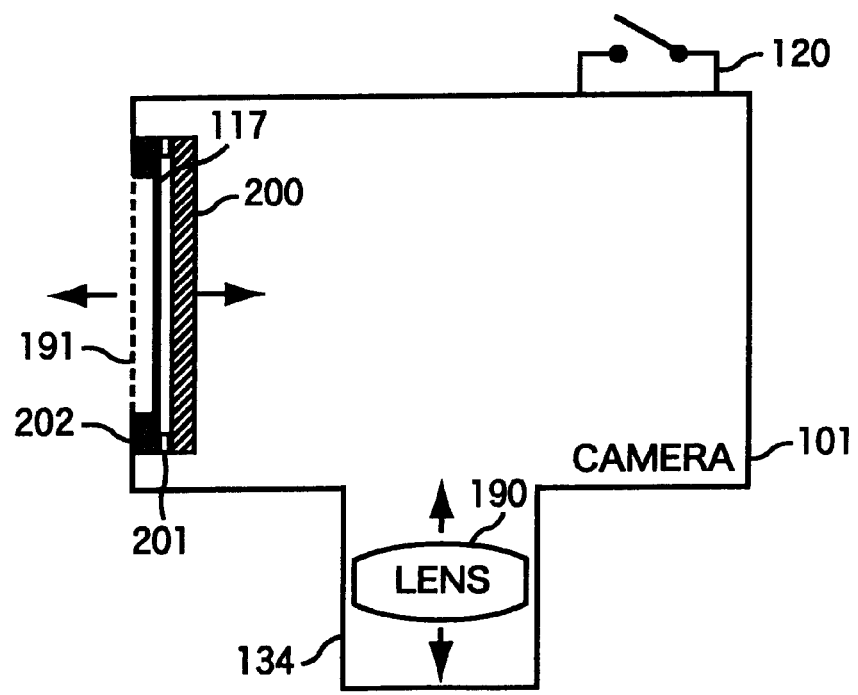
FIG. 23 is a diagram showing still another example of construction for the oxidizing agent replenishment processing.

FIGS. 22 and 23 show another example of the construction of the oxidizing agent replenishment part 121.

For instance, in this example, a piezoelectric type speaker 200 is installed on the right side in FIGS. 22 and 23 of the air holes 191 and oxidizing agent permeable membrane 117 shown in FIGS. 20 and 21. Holes 201 are formed in the outer circumference of a frame 202 that is used to attach this speaker 200. The space inside the camera 101 communicates with the outside via the holes 201, oxidizing agent permeable membrane 117 and air holes 191, so that the air inside the camera 101 can flow in and out via these parts.

Furthermore, in the example shown in FIGS. 22 and 23, a speaker 200 is installed in a position facing the air holes 191. However, the present invention is not limited to this; it would also be possible to install a microphone in this position facing the air holes 191.

By doing this, it is possible to cause air to flow in and out between the interior of the camera 101 and the outside by the vibration of the vibrating plate of the speaker 200 or microphone.

Furthermore, it is possible to use only the advancing and retracting operation of the lens barrel 134 or lens 190, or the vibration of the speaker 200 or microphone, or to use both of these in combination.

Next, still another example of construction of the oxidizing agent replenishment part 121 will be described with reference to FIG. 24.

A substantially cylindrical base 212 is disposed on the left side of the camera 101 in the figures, and air holes 191 that cause the space inside the camera 101 to communicate with the outside are formed in this base 212, so that air flows into and out of the interior of the camera 101 via these air holes 191. A valve 213 is disposed on the right side of the air holes 191 in the figures (i. e., inside the base 212), and this valve 213 is driven by a spring 210 so that this valve 213 closes the air holes 191. A plunger 132 drives the valve 213 rightward in the figures against the driving force of the spring 210, and opens the air holes 191. An electromagnetic valve 133 is constructed by this plunger 132, spring 210 and valve 213. Holes 211 which cause the space inside the camera 101 to communicate with the space inside the base 212 and the outside via the air holes 191 when the valve 213 is driven by the plunger 132 are formed in the base 212.

Furthermore, a fan 131 which is caused to rotate by a fan motor 131A is installed inside the camera 101; this fan 131 exchanges the air inside the camera 101. In the case of this example, the fan 131 rotates when the valve 213 of the electromagnetic valve 133 opens the air holes 191.

When the valve 213 of the electromagnetic valve 133 is closed, the camera 101 is in a tightly sealed state. As a result, a waterproof structure can be formed; however, in cases where a waterproof structure is not to be formed, the electromagnetic valve 133 may be omitted.

Figure 24:
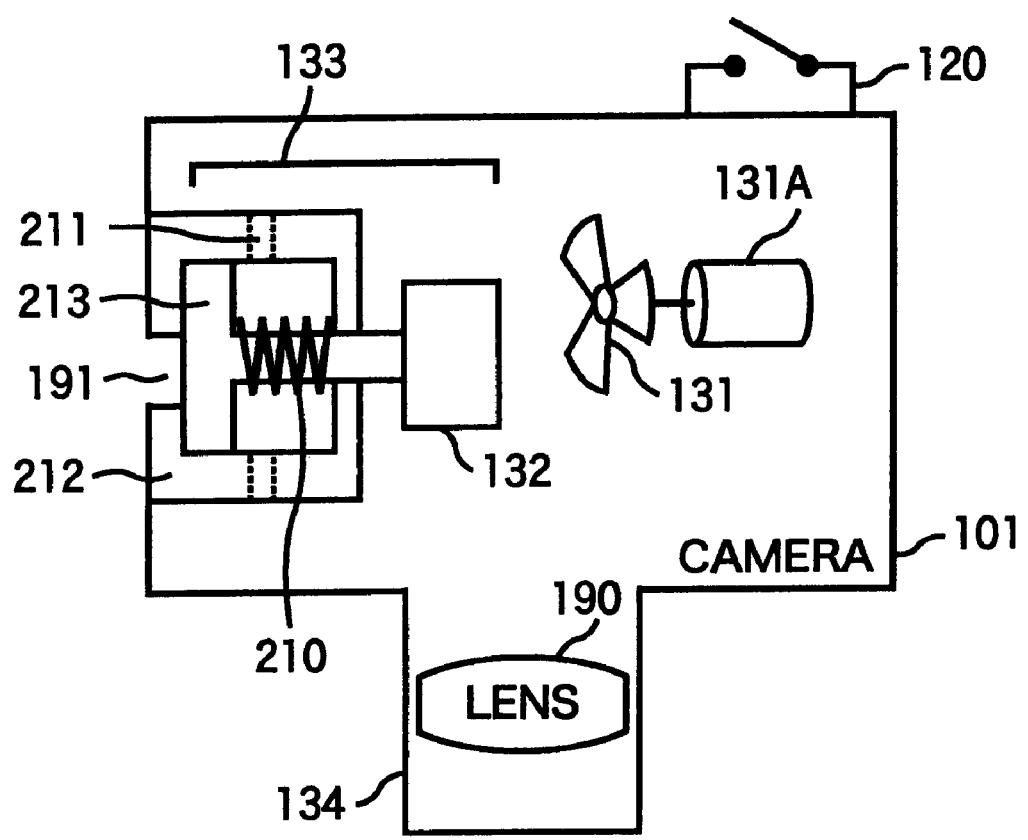
FIG. 24 is a diagram showing another example of construction for the oxidizing agent replenishment processing.
Figure 25:
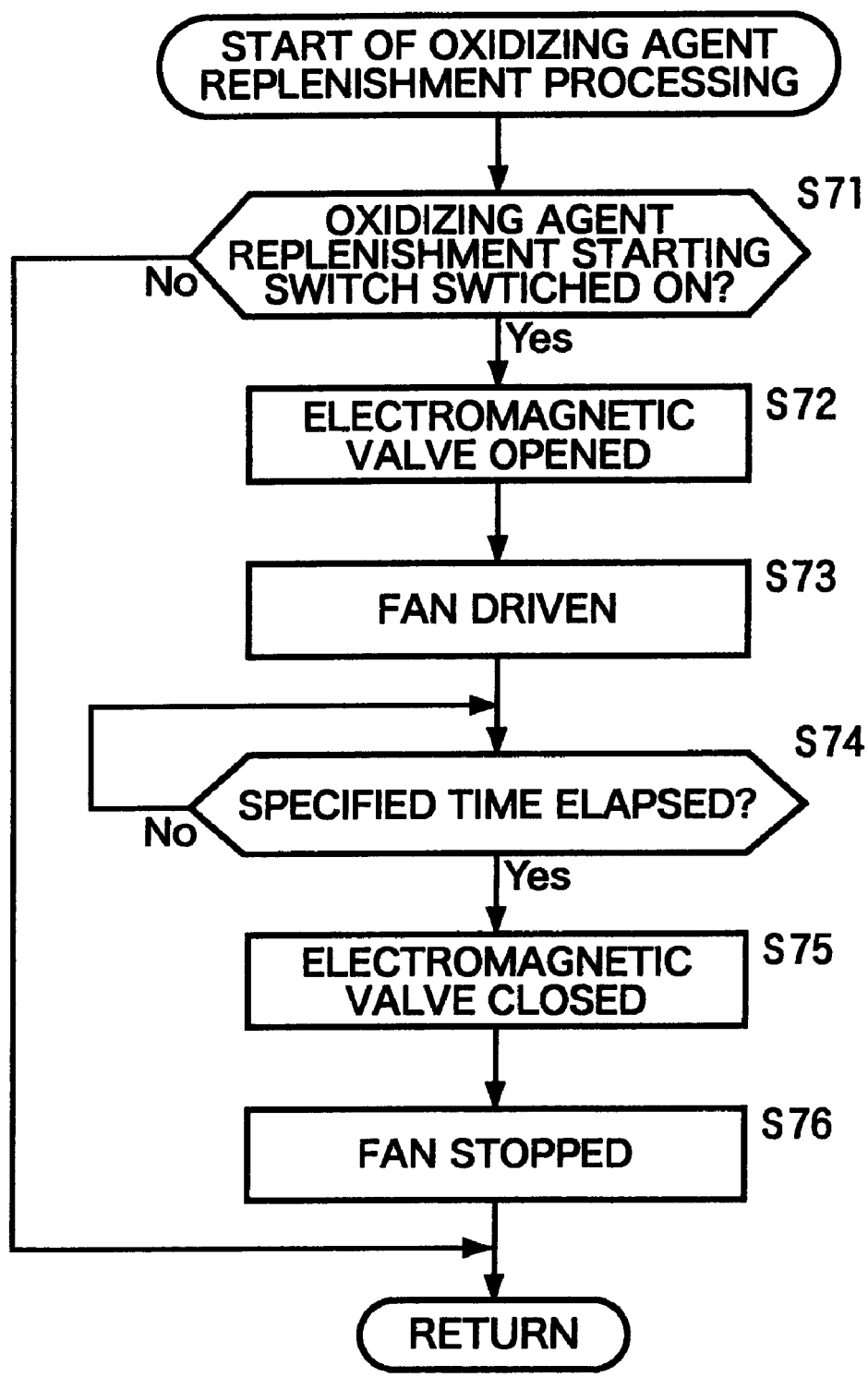
FIG. 25 is a flow chart illustrating the oxidizing agent replenishment processing in the camera shown in FIG. 24.

FIG. 25 is a flow chart illustrating the oxidizing agent replenishment processing that is performed in the example of construction shown in FIG. 24. Furthermore, this processing is executed as the processing of step S30 in FIG. 14.

In step S71, the microcomputer 111 judges whether or not the oxidizing agent replenishment starting switch has been switched on. The oxidizing agent replenishment switch 120 is switched on and off by the user. The user switches this switch on when oxidizing agent replenishment is permitted, and switches this switch off when oxidizing agent replenishment is not permitted.

In cases where it is judged in step S71 that the oxidizing agent replenishment starting switch 120 has been switched on, the processing proceeds to step S72, and the microcomputer 111 drives the plunger 132 of the electromagnetic valve 133 so that the valve 213 is caused to move rightward in FIG. 24 against the driving force of the spring 210. As a result, the outside is caused to communicate with the space inside the camera 101 via the air holes 191, space inside the base 212 and holes 211.

In step S73, the microcomputer 111 drives the fan motor 131A so that the fan 131 is caused to rotate. As a result, outside air flows into the interior of the camera 101 via the air holes 191, space inside the base 212, and holes 211, or air inside the camera 101 is discharged to the outside via the reverse path.

In step S74, the microcomputer 111 judges whether or not a preset specified time has elapsed following the rotation of the fan 131 (i. e., whether or not a specified time has elapsed following the execution of the processing of step S72 and step S73). In cases where it is judged that this specified time has not yet elapsed, the processing waits until this specified time has elapsed.

In cases where it is judged in step S74 that the specified time has elapsed, the processing proceeds to step S75, and the microcomputer 111 interrupts the driving of the plunger 132. As a result, the valve 213 is caused to move leftward in FIG. 24 by the driving force of the spring 210, so that the air holes 191 are closed. As a result, the camera 101 assumes a tightly sealed state, so that outside air ceases to flow in and out.

Following the processing of step S75, the processing proceeds to step S76, and the microcomputer 111 interrupts the driving of the fan motor 131A, stops the rotation of the fan 131, and ends the processing. In cases where it is judged in step S71 that the oxidizing agent replenishment starting switch has been switched off, the processing of step S72 through step S76 is skipped.

Thus, by switching on the oxidizing agent replenishment starting switch 120, the user can cause the fan 131 to rotate and supply air to the camera 101 by the processing shown in FIG. 25.

Furthermore, in the example shown in FIGS. 24 and 25, a fan 131 is installed; however, it would also be possible to omit this fan 131. In this case, in the flow chart shown in FIG. 25, the processing of steps S73 and S76 is omitted, and natural air exchange is performed.

Figure 26:
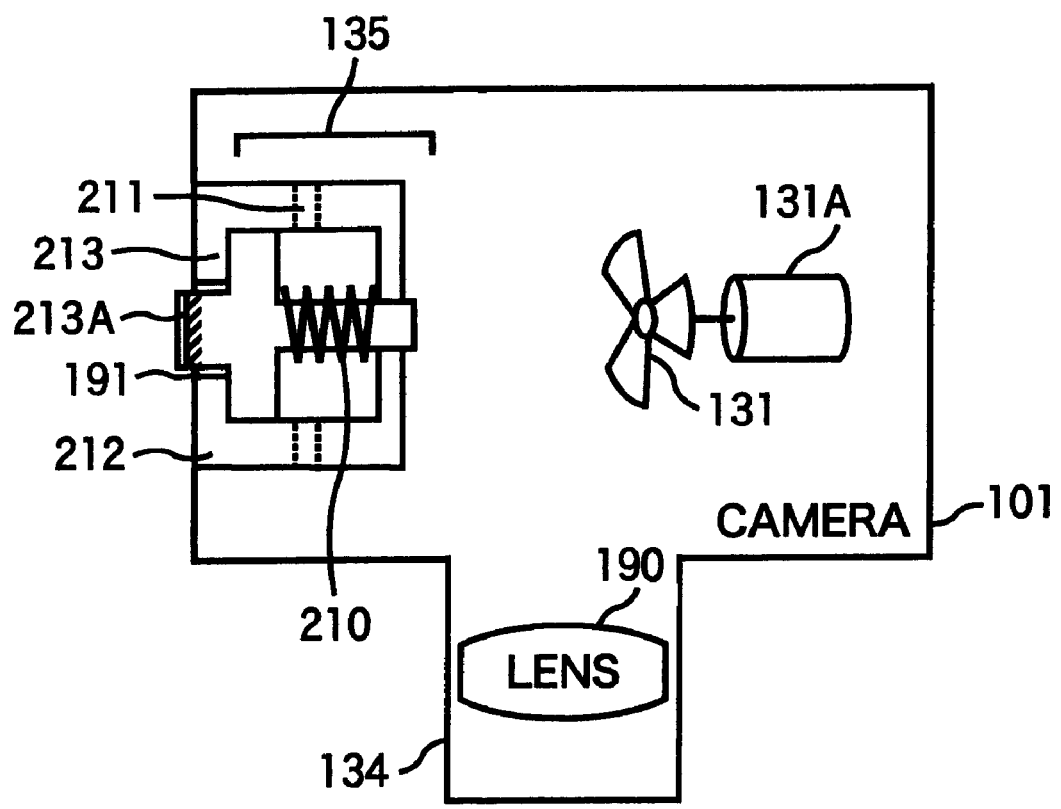
FIG. 26 is a diagram showing another example of construction for the oxidizing agent replenishment processing'

FIG. 26 shows still another example of construction of the oxidizing agent replenishment part 121.

In the example shown in FIG. 26, the electromagnetic valve 133 in FIG. 24 is replaced by a manual valve 135. Specifically, the plunger 132 in FIG. 24 is omitted, and a button 213A is installed on the left side of the valve 213 in the figures (i. e., on the outside of the camera 101) so that this button 213A protrudes to the outside of the camera 101.

When the button 213A is pressed by the user in the rightward direction in the figures, the valve 213 which is formed as an integral unit with the button 213A moves rightward in the figures against the driving force of the spring 210, and opens the air holes 191.

When the pressing of the button 213A is released, the valve 213 is caused to move leftward in the figures by the driving force of the spring 210, so that the air holes 191 are closed.

Although this is not shown in the figures, a switch that is switched on or off in response to the operation of the button 213A is installed, and a signal from this switch is input into the microcomputer 111.

The remaining construction is the same as in the case of FIG. 24.

Figure 27:
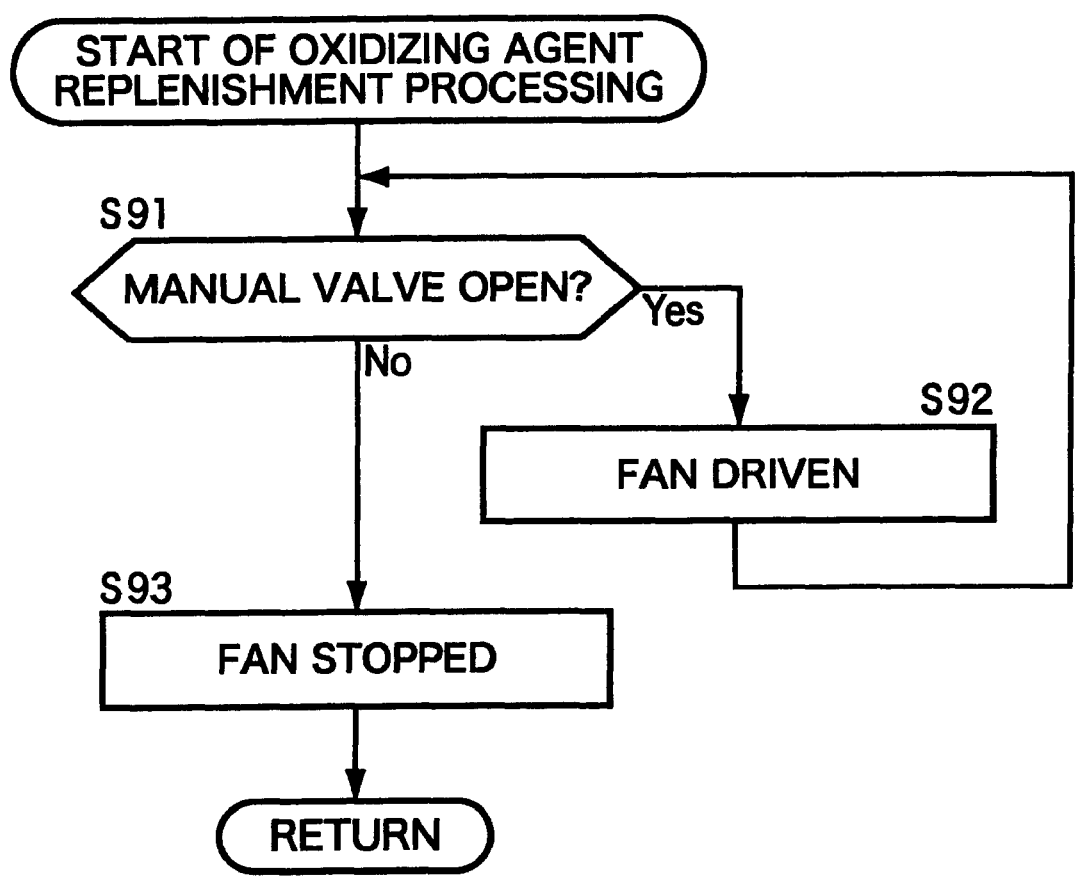
FIG. 27 is a flow chart illustrating the oxidizing agent replenishment processing in the camera shown in FIG. 26.

FIG. 27 is a flow chart illustrating the oxidizing agent replenishment processing in the example of construction shown in FIG. 26. Furthermore, this processing is executed as the processing of step S30 in FIG. 14.

In step S91, the microcomputer 111 judges whether or not the valve 213 of the manual valve 135 has been opened (i. e., whether or not the button 213A has been pressed (so that the corresponding switch has been switched on)).

In cases where it is judged in step S91 that the valve 213 of the manual valve 135 has been opened, the processing proceeds to step S92, and the microcomputer 111 drives the fan motor 131A so that the fan 131 is caused to rotate. As a result of the opening of the valve 213 of the manual valve 135, the outside air communicates with the space inside the camera 101 via the air holes 191, space inside the base 212, and holes 211. Furthermore, as a result of the fan 131 being caused to rotate, outside air flows into and out of the interior of the camera 101 via the air holes 191, space inside the base 212, and holes 211, or air inside the camera 101 is discharged to the outside via the opposite path.

Following the processing of step S92, the processing returns to step S91, and the subsequent processing is repeated. Specifically, while the valve 213 of the manual valve 135 is open (i. e., while the button 213A is being pressed), the fan 131 is caused to rotate, so that the air in the camera 101 is exchanged.

In cases where it is judged in step S91 that the valve 213 of the manual valve 135 is closed (i. e., that the button 213A is not being pressed), the processing proceeds to step S93, and the microcomputer 111 interrupts the driving of the fan motor 131A, stops the rotation of the fan 131, and ends the processing.

Thus, in cases where the oxidizing agent is insufficient, the user, by pressing the button 213A mounted on the vale 213 of the manual valve 135, can cause the fan 131 to rotate and supply air to the camera 101 by the processing shown in FIG. 27.

Furthermore, the fan 131 may also be used as an internal fan that is installed in the camera 101 beforehand.

Figure 28:
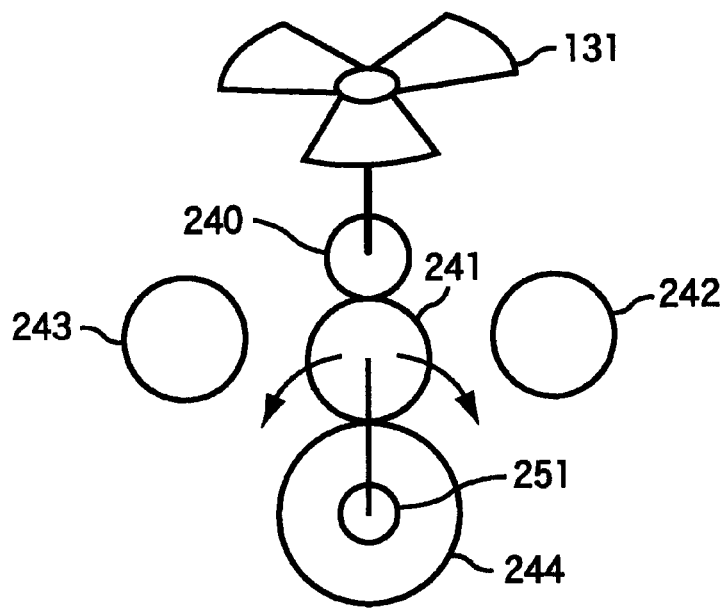
FIG. 28 is a diagram showing the driving construction of the fan.
Figure 29:
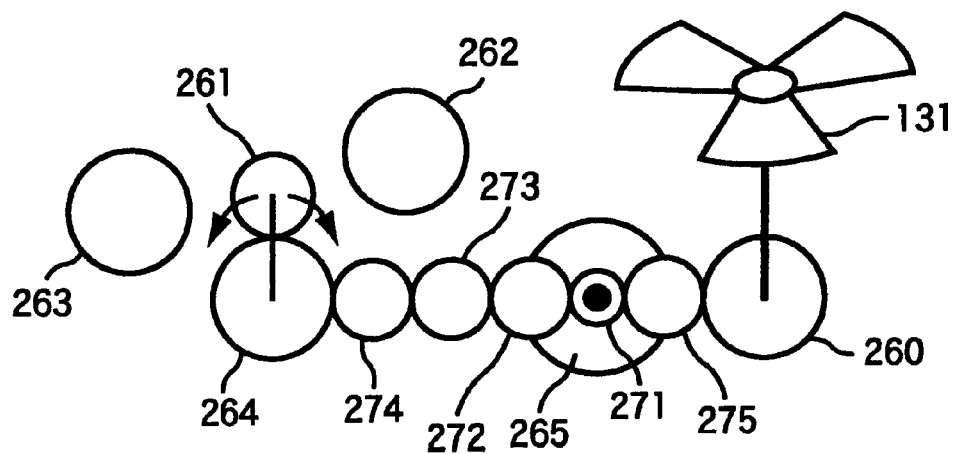
FIG. 29 is a diagram showing the driving construction of the fan.

Furthermore, the fan motor 131A of the fan 131 may be a dedicated motor; alternatively, this motor may also be used as the lens barrel motor 134A (i. e., the lens barrel motor 134A shown in FIG. 2), or may also be used as a feeding motor as shown in FIGS. 28 and 29.

In the case of the example shown in FIG. 28, the rotating shaft of the fan 131 is coupled with a gear 240. Here, a sun gear 244 is coaxially coupled with a feeding motor 251, and a planetary gear 241 engages with this sun gear 244. The gear 240 engages with this planetary gear 241.

When the sun gear 244 is caused to rotate (revolve) in the clockwise direction in the figures by the feeding motor 251, the planetary gear 241 accordingly revolves in the clockwise direction while being caused to rotate in the counterclockwise direction in the figures. As a result, the planetary gear 241 engages with a winding system 242, so that the winding system 242 winds the film (not shown in the figures).

Furthermore, when the sun gear 244 is caused to rotate in the counterclockwise direction in the figures by the feeding motor 251, the planetary gear 241 accordingly revolves in the counterclockwise direction in the figures. As a result, the planetary gear 241 engages with a rewinding system 243 so that the rewinding system 243 rewinds the film.

Furthermore, when the planetary gear 241 arrives in the position shown in FIG. 28 (a position on a straight line connecting the center of the gear 240 and the center of the sun gear 244), the planetary gear 241 engages with the gear 240, and the fan 131 is caused to rotate by the rotation of the sun gear 244.

In the case of the example shown in FIG. 29, the rotating shaft of the fan 131 is coupled with a gear 260. Furthermore, as in the example shown in FIG. 28, a planetary gear 261, winding system 262, rewinding system 263 and sun gear 264 are installed. Furthermore, the rotation of the feeding motor 265 is transmitted from the coaxial gear 271 to the sun gear 264 via a gear 272, gear 273 and gear 274, and is transmitted to the gear 260 via a gear 275. As a result of the rotation of the feeding motor 265, the sun gear 264 rotates, and the gear with which the planetary gear 261 is engaged (winding system 262 or rewinding system 263) is caused to rotate. Furthermore, as the feeding motor 265 rotates, the gear 260 rotates, and the fan 131 rotates. As a result, the fan 131 can be caused to rotate along with the driving of the feeding motor 265.

Since the system is devised so that the generated voltage, residual fuel amount and oxidizing agent concentration of the fuel cell 112 are detected by the abovementioned processing, the state of the fuel cell can be accurately determined. Furthermore, in cases where it is judged that the fuel cell 112 has an insufficient amount of oxidizing agent, the oxidizing agent can be supplied either automatically or manually (as necessary). As a result, the oxidizing agent concentration can be increased.

Furthermore, the oxidizing agent replenishment processing may be processing that moves the lens barrel 134 as shown in FIGS. 19 and 20, or processing that moves the lens 190 as shown in FIG. 21. Moreover, a speaker 200 may also be installed as shown in FIGS. 22 and 23. In addition, an electromagnetic valve 133 may also be installed as shown in FIGS. 24 and 25, and a fan 131 may be added. Moreover, a manual valve 135 may be installed as shown in FIGS. 26 and 27, and a fan 131 may be added.

Figure 14:
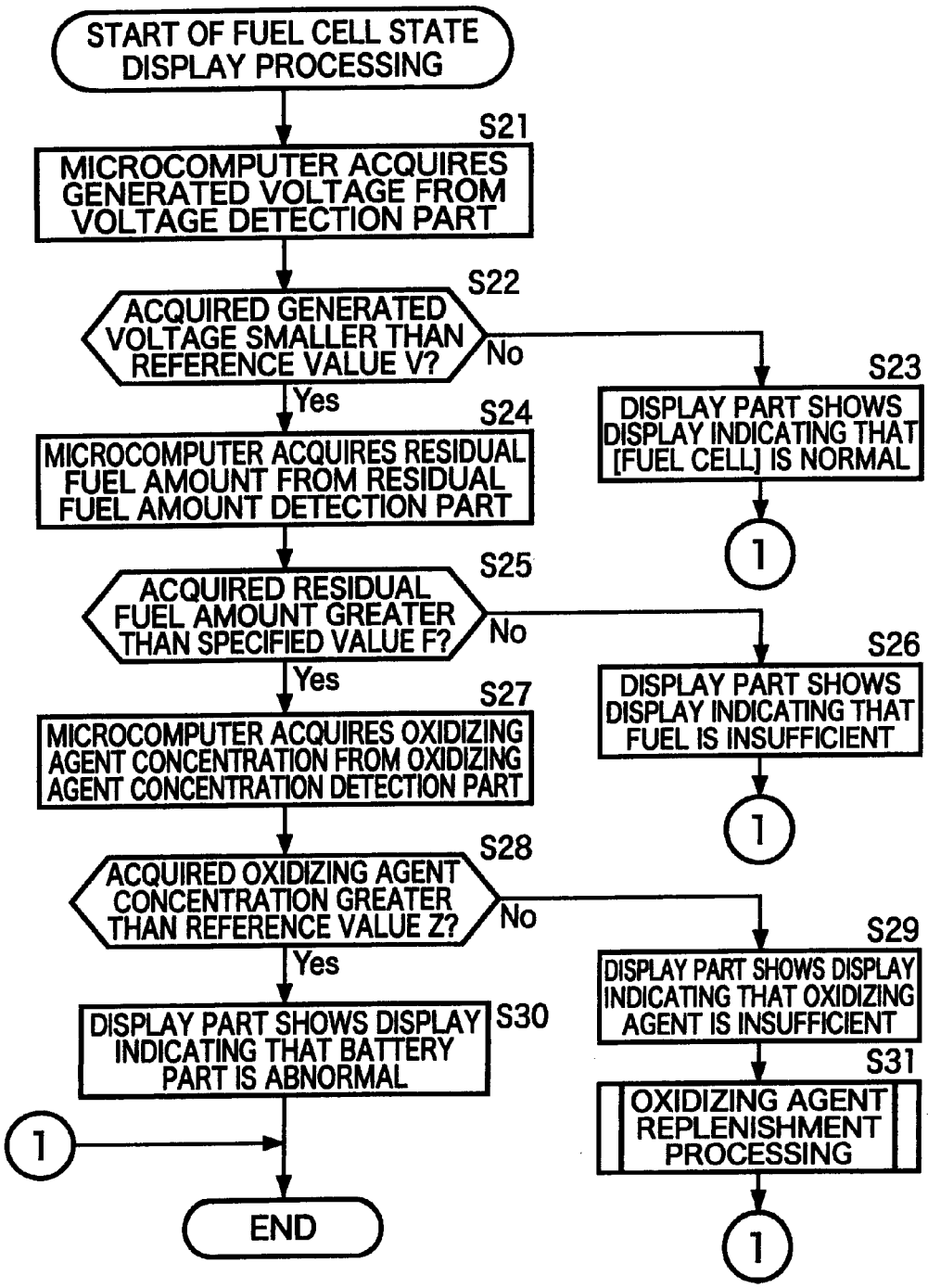
FIG. 14 is a flow chart illustrating the state display processing for the fuel cell in the camera shown in FIG. 9.

Furthermore, in the above examples, an oxidizing agent replenishment switch 120 was installed, and the system was devised so that replenishment was started by switching on this oxidizing agent replenishment starting switch 120; however, it would also be possible to devise the system so that oxidizing agent replenishment processing is automatically started in cases where it is judged that the oxidizing agent is insufficient (i. e., in the case of a judgment of NO in step S28 of FIG. 14).

Furthermore, in cases where the camera 101 is not constructed with a waterproof or anti-drip structure, it would also be possible to omit the oxidizing agent permeable membrane 117, and to install only air holes 191.

Furthermore, in the present embodiment, an electromagnetic valve 133 was installed. However, a magnet valve or the like may also be used, or some other structure may be used, as long as this structure is capable of opening and closing holes (e. g., the air holes 191).

Above, a case in which the present invention was applied to a camera was described; however, the present invention can be applied to digital cameras other than the abovementioned camera, or to other portable electronic devices.

Furthermore, in the present specification, the steps describing computer programs naturally include processing performed in a time sequence according to the described order, but also include processing that is not necessarily performed in this time sequence, but is rather performed in parallel or individually.

INDUSTRIAL APPLICABILITY

In the first invention of the present application, the state of the fuel cell can be determined. In particular, abnormalities of the fuel cell can be accurately determined and displayed.

In the second invention of the present application, the state of the fuel cell can be determined. In particular, the oxidizing agent can be supplied to the fuel cell as required.

In the third invention of the present application, the state of the fuel cell can be determined. In particular, the oxidizing agent can be supplied to the fuel cell.

The invention claimed is:
1. An electronic device using a fuel cell as a power supply, comprising:
voltage detection means for detecting the voltage generated by said fuel cell;
residual fuel amount detection means for detecting the residual amount of fuel in said fuel cell;

oxidizing agent concentration detection means for detecting the concentration of the oxidizing agent in said fuel cell;

judgment means for judging the state of said fuel cell on the basis of the detection results of said voltage detection means, said residual fuel amount detection means and said oxidizing agent concentration detection means; and display means for displaying the state of said fuel cell judged by said judgment means, wherein if the judgment means judges that the voltage detected by the voltage detection means is greater than a specified voltage reference value, the display means displays that the state of the fuel cell is normal, wherein if the judgment means judges that the voltage is less than the specified voltage reference value, the judgment means further judges the residual amount of the fuel detected by the residual fuel detection means, wherein if the judgment means judges that the residual fuel amount is smaller than a specified fuel reference value, the display means displays that the residual fuel amount in the fuel cell is insufficient, and if the judgment means judges that the residual fuel amount is greater than the specified reference fuel value, the judgment means further judges the oxidizing agent concentration detected by the oxidizing agent concentration detection means, and wherein if the judgment means judges that the oxidizing agent concentration is less than a specified oxidizing agent concentration value, the display means displays that the oxidizing agent is insufficient, and if the judgment means judges that the oxidizing agent concentration is greater than the specified oxidizing agent concentration value, the display means displays that the state of the fuel cell is abnormal.

2. The electronic device according to claim 1, wherein in cases where it is judged by said judgment means that said voltage is greater than said voltage reference value, said display means displays that the state of said fuel cell is normal using a display corresponding to the amount of time left on said fuel cell.

3. The electronic device according claim 1, wherein in cases where it is judged by said judgment means that said oxidizing agent concentration is smaller than said oxidizing agent concentration reference value, said display means displays that said oxidizing agent is insufficient using a display corresponding to a frame count of said electronic device.

4. The electronic device according to claim 1, wherein in cases where it is judged by said judgment means that said oxidizing agent concentration is greater than said oxidizing agent concentration reference value, said display means displays that the state of said fuel cell is abnormal by using a display corresponding to the amount of time left on said fuel cell and a display corresponding to a frame count of said electronic device, and also causing these displays to flash.

5. The electronic device according to claim 1, wherein in cases where it is judged by said judgment means that said residual fuel amount is smaller than said fuel reference value, said display means displays that said residual fuel amount is insufficient using a display corresponding to the amount of time left on said fuel cell.

6. An operating control method for judging a state of a fuel cell in an electronic device using the fuel cell as a power supply, comprising:

using a judgment means to judge the state of the fuel cell; and displaying the judged state of the fuel cell judged by the judgment means, wherein if the judgment means judges that a detected voltage of the fuel is greater than a specified voltage reference value, displaying the judged state of the fuel cell as being normal, wherein if the judgment means judges that the detected voltage of the fuel cell is less than a specified voltage reference value, further detecting a residual amount of fuel in the fuel cell, wherein:

if the judgment means judges that the residual fuel amount is smaller than a specified fuel reference value, displaying the judged state of the fuel cell as the residual fuel amount in the fuel cell being insufficient, or if the judgment means judges that the residual fuel amount is greater than a specified fuel reference value, further detecting the oxidizing agent concentration of the fuel cell, wherein:

if the judgment means judges that the detected oxidizing agent concentration is less than a specified oxidizing agent concentration value, displaying the judged state of the fuel cell as the oxidizing agent in the fuel cell being insufficient, or if the judgment means judges that the detected oxidizing agent concentration is greater than the specified oxidizing agent concentration value, displaying the judged state of the fuel cell as being abnormal.

* * * * *